United States Patent
Emmanuel et al.

(10) Patent No.: US 9,439,086 B2
(45) Date of Patent: *Sep. 6, 2016

(54) NEAR-FIELD MIMO WIRELESS TEST SYSTEMS, STRUCTURES, AND PROCESSES

(71) Applicant: NETGEAR, Inc., San Jose, CA (US)

(72) Inventors: Joseph Amalan Arul Emmanuel, Cupertino, CA (US); Jonathan M. Hummel, Indo, CA (US); Charles W. Reed, San Jose, CA (US); Gin C. Wang, San Jose, CA (US)

(73) Assignee: NETGEAR, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/822,709

(22) Filed: Aug. 10, 2015

(65) Prior Publication Data

US 2015/0349859 A1 Dec. 3, 2015

Related U.S. Application Data

(63) Continuation of application No. 13/647,250, filed on Oct. 8, 2012, now Pat. No. 9,107,098.

(51) Int. Cl.
*H04B 17/00* (2015.01)
*H04W 24/06* (2009.01)
(Continued)

(52) U.S. Cl.
CPC ........... *H04W 24/06* (2013.01); *H04B 5/0043* (2013.01); *H04B 7/0413* (2013.01); *H04B 17/12* (2015.01); *H04B 17/3912* (2015.01); *H04B 5/0025* (2013.01); *H04B 17/0085* (2013.01); *H04B 17/14* (2015.01)

(58) Field of Classification Search
CPC .............. H04B 17/00; H04B 17/0085; G01R 29/0821
USPC ............ 455/423, 67.11, 67.12, 67.14, 115.1, 455/115.2
See application file for complete search history.

(56) References Cited

U.S. PATENT DOCUMENTS 7,925,253 B2  4/2011  Breit et al.
7,965,986 B2*  6/2011  Foegelle ............... H04W 24/00
                                                                324/627

(Continued)

FOREIGN PATENT DOCUMENTS

WO    2009046516 A1    4/2009

OTHER PUBLICATIONS

"AMS-8700 MIMO OTA Test System", ETS-Lindgren; retrieved online on Nov. 30, 2012 from url: https://www.ets-lindgren.com/MIMOWirelessTestSystem, 2 pages.

(Continued)

*Primary Examiner* — Sonny Trinh
(74) *Attorney, Agent, or Firm* — Michael A. Glenn; Perkins Coie LLP

(57) ABSTRACT

Systems, processes, and structures allow enhanced near-field testing of the uplink and/or downlink performance of MIMO wireless devices (DUT), such as for any of product development, product verification, and/or production testing. Signal channels may preferably be emulated to test the performance of a device under test (DUT) over a range of simulated distances, within a near-field test environment. An enhanced process provides automated testing of a DUT over a wireless network, e.g. such as but not limited to a WLAN. The enhanced MIMO channel emulator may preferably be operated over a high dynamic range.

20 Claims, 18 Drawing Sheets

(51) Int. Cl.
*H04B 5/00* (2006.01)
*H04B 17/12* (2015.01)
*H04B 7/04* (2006.01)
*H04B 17/391* (2015.01)
*H04B 17/14* (2015.01)

(56) References Cited

U.S. PATENT DOCUMENTS

| | | | | |
|---|---|---|---|---|
| 8,412,112 B2 * | 4/2013 | Foegelle | ................ | H04B 17/21 455/67.11 |
| 8,743,705 B2 | 6/2014 | Holman et al. | | |
| 8,824,588 B2 * | 9/2014 | Emmanuel | ............. | H04B 17/10 375/224 |
| 9,107,098 B2 * | 8/2015 | Emmanuel | ............ | H04W 24/06 |
| 9,116,232 B2 * | 8/2015 | Goel | ........................ | G01S 19/23 |
| 2002/0091966 A1 | 7/2002 | Barton et al. | | |
| 2007/0243826 A1 | 10/2007 | Lui | | |
| 2010/0285753 A1 | 11/2010 | Foegelle | | |
| 2011/0084887 A1 | 4/2011 | Mow et al. | | |
| 2011/0263215 A1 | 10/2011 | Asplund et al. | | |
| 2012/0039178 A1 | 2/2012 | Holman et al. | | |
| 2012/0100813 A1 | 4/2012 | Mow et al. | | |
| 2012/0244818 A1 | 9/2012 | Kyosti et al. | | |
| 2013/0027256 A1 | 1/2013 | Guo et al. | | |
| 2013/0257454 A1 | 10/2013 | Mow et al. | | |

OTHER PUBLICATIONS

Azimuth Systems, "MIMA OTA Test, Over-the-Air Test: Real World Performance Measurement", retrieved online on Nov. 30, 2012 from url: http://www.azimuthsystems.com/products/rpm/, 2 pages.

IEEE, IEEE Standards Department, Draft Recommended Practice for the Evaluation of 802.11 Wireless Performance; P802. 11. 2TM/D1.01, Feb. 1, 2008.

Mlinarsky, F., "Test MIMO Wi-Fi and LTE radios over the air", Wireless Test; www.tmworld.com; Test & Measurement World, Mar. 28, 2012, 3 pages.

Rohde & Schwarz, "R&S TS8991 OTA Performance Test System;2012", retrieved online on Nov. 30, 2012 at url: http://www2.rohde-schwarz.com/en/products/test_and_measurement/mobile_radio/TS8991-%7C-Overview-%7C-100-%7C-6539.html, unknown, 2 pages.

Satimo, "StarMIMO-HU", retrieved online on Nov. 30, 2012 at http://www.satimo.com/content/products/starmimo-hu, unknown, 1 page.

* cited by examiner

| Access Point (RAS UNIT) | | |
|---|---|---|
| Atten | DL (RAS) | UL (RAS) | BI |
| 55 | 184.74 | 194.71 | 195.12 |
| 61 | 185.22 | 179.2 | 193.79 |
| 67 | 184.49 | 185.04 | 194.11 |
| 73 | 182.13 | 145.48 | 157.49 |
| 79 | 180.21 | 146.94 | 157.77 |
| 85 | 173.75 | 117.35 | 127.79 |
| 91 | 123.48 | 77.73 | 93.49 |
| 97 | 78.89 | 49.2 | 61.21 |
| 103 | 54.29 | 21.96 | 26.24 |
| 109 | 9.52 | 2.55 | 2.0 |
| 115 | 0 | 0 | 0 |
| 121 | 0 | 0 | 0 |
| 127 | 0 | 0 | 0 |
| 133 | 0 | 0 | 0 |
| 139 | 0 | 0 | 0 |
| 145 | 0 | 0 | 0 |
| 151 | 0 | 0 | 0 |
| 157 | 0 | 0 | 0 |

Fig. 11

| Access Point (QC UNIT) 1 | | |
|---|---|---|
| Atten | MASK | UL |
| 63 | 167 | 186.1 |
| 69 | 165 | 183.54 |
| 75 | 160 | 177.73 |
| 81 | 137 | 152.57 |
| 87 | 92 | 127.41 |
| 93 | 52 | 102.25 |
| 99 | 19 | 77.09 |
| 105 | 0 | 51.93 |
| | | 26.77 |
| | | 1.61 |
| | | 0 |

Fig. 12

| Access Point (QC UNIT) 2 | | |
|---|---|---|
| Atten | MASK | UL |
| 61 | 174 | 190.46 |
| 67 | 175 | 191.48 |
| 73 | 162 | 177.63 |
| 79 | 132 | 148.23 |
| 85 | 85 | 118.83 |
| 91 | 41 | 89.43 |
| | | 60.03 |
| | | 30.63 |
| | | 1.23 |
| | | 0 |

| Access Point (QC UNIT) | | |
|---|---|---|
| Atten | MASK | UL |
| 63 | 162 | 193.04 |
| 69 | 178 | 186.74 |
| 75 | 134 | 149.26 |
| 81 | 118 | 131.91 |
| 87 | 74 | 114.56 |
| 93 | 37 | 97.21 |
|  |  | 79.86 |
|  |  | 62.51 |
|  |  | 45.16 |
|  |  | 27.81 |
|  |  | 10.46 |
|  |  | 0 |

| Access Point (RAS UNIT) | | | |
|---|---|---|---|
| Atten | DL | UL | BI |
| 55 | 184.31 | 180.09 | 190.51 |
| 61 | 184.11 | 170.95 | 177.17 |
| 67 | 182.25 | 164.19 | 172.49 |
| 73 | 180.69 | 134 | 148.74 |
| 79 | 181.76 | 106.84 | 123.22 |
| 85 | 179.77 | 94.8 | 111.8 |
| 91 | 118.99 | 58.18 | 72.34 |
| 97 | 95.22 | 41.15 | 51.67 |
| 103 | 57.25 | 17.79 | 22.7 |
| 109 | 0.33 | 0.72 | 0.91 |
| 115 | 0 | 0 | 0 |
| 121 | 0 | 0 | 0 |
| 127 | 0 | 0 | 0 |
| 133 | 0 | 0 | 0 |
| 139 | 0 | 0 | 0 |
| 145 | 0 | 0 | 0 |
| 151 | 0 | 0 | 0 |
| 157 | 0 | 0 | 0 |

Fig. 15

| Access Point (AP) (RAS UNIT) | | | |
|---|---|---|---|
| Atten | BI | DL | UL |
| 52 | 247.8 | 272.4 | 220.49 |
| 58 | 259.39 | 267.03 | 233.27 |
| 64 | 258.43 | 262.51 | 237.03 |
| 70 | 256.38 | 264.61 | 235.3 |
| 76 | 241.37 | 258.91 | 215.07 |
| 82 | 187.09 | 212.74 | 160.5 |
| 88 | 127.98 | 154.05 | 98.03 |
| 94 | 87.17 | 120.92 | 68.2 |
| 100 | 46.83 | 80.36 | 34.08 |
| 106 | 21.69 | 36.68 | 16.73 |
| 112 | 0.44 | 0.59 | 0.56 |
| 118 | 0 | 0 | 0 |
| 124 | 0 | 0 | 0 |
| 124 | 0 | 0 | 0 |
| 124 | 0 | 0 | 0 |
| 130 | 0 | 0 | 0 |
| 130 | 0 | 0 | 0 |
| 130 | 0 | 0 | 0 |
| 136 | 0 | 0 | 0 |
| 136 | 0 | 0 | 0 |
| 136 | 0 | 0 | 0 |
| 142 | 0 | 0 | 0 |
| 142 | 0 | 0 | 0 |
| 142 | 0 | 0 | 0 |
| 148 | 0 | 0 | 0 |
| 148 | 0 | 0 | 0 |
| 148 | 0 | 0 | 0 |
| 154 | 0 | 0 | 0 |
| 154 | 0 | 0 | 0 |
| 154 | 0 | 0 | 0 |
| 160 | 0 | 0 | 0 |
| 160 | 0 | 0 | 0 |
| 160 | 0 | 0 | 0 |
| 166 | 0 | 0 | 0 |
| 166 | 0 | 0 | 0 |
| 166 | 0 | 0 | 0 |
| 172 | 0 | 0 | 0 |
| 172 | 0 | 0 | 0 |
| 172 | 0 | 0 | 0 |
| 178 | 0 | 0 | 0 |
| 178 | 0 | 0 | 0 |
| 178 | 0 | 0 | 0 |
| 184 | 0 | 0 | 0 |
| 184 | 0 | 0 | 0 |
| 184 | 0 | 0 | 0 |

| Access Point (AP) (QC UNIT) 1 | | |
|---|---|---|
| Atten | MASK | DL |
| 63 | 243 | 285.32 |
| 69 | 228 | 286.07 |
| 75 | 223 | 277.18 |
| 81 | 198 | 280.94 |
| 87 | 151 | 263.63 |
| 93 | 108 | 198.05 |
| 99 | 42 | 140.22 |
|  |  | 82.39 |
|  |  | 24.56 |
|  |  | 0 |

| Access Point (AP) (QC UNIT) 2 | | |
|---|---|---|
| Atten | MASK | DL |
| 63 | 267 | 277.39 |
| 69 | 269 | 279.47 |
| 75 | 266 | 275.66 |
| 81 | 258 | 268.06 |
| 87 | 249 | 259.06 |
| 93 | 207 | 217 |
| 99 | 157 | 166.84 |
|  |  | 116.68 |
|  |  | 66.52 |
|  |  | 16.36 |
|  |  | 0 |

Fig. 21

NEAR-FIELD MIMO WIRELESS TEST SYSTEMS, STRUCTURES, AND PROCESSES

CROSS REFERENCE TO RELATED APPLICATIONS

This application is a continuation application of U.S. patent application Ser. No. 13/647,250, filed Oct. 8, 2012, which is incorporated herein in its entirety by this reference thereto.

BACKGROUND OF THE INVENTION

1. Technical Field

The invention relates generally to testing structures and processes for wireless or RF (radio frequency) communications systems. More particularly, the invention relates to structures and processes that provide near-field testing of MIMO wireless devices and systems.

2. Description of the Background Art

Single-input single-output (SISO) wireless devices have been developed and implemented for many years, to transmit and/or receive desired signals to/from other elements, to provide wireless connectivity and communication between devices in a wireless network, such as in a wireless PAN (personal area network), a wireless LAN (local area network) a wireless WAN (wide area network), a cellular network, or virtually any other radio network or system. Such SISO devices may operate over a wide variety of frequency bands, such as but not limited to 2.4 GHz and 5.0 GHz bands. Test systems and standardized test models have also been developed and implemented over the years for SISO wireless devices.

However, the growing demand for increased bandwidth, i.e. requirements for increased data transfer, has driven the development of multiple-input multiple output (MIMO) devices.

While numerous systems and standardized models have been developed for the testing of SISO devices, there are currently no standard systems and models to adequately test the performance of multiple-input multiple output (MIMO) devices.

It would therefore be advantageous to provide a system, structure and method that provide adequate performance testing for MIMO devices for a variety of operating conditions. Such a system and process would constitute a major technological advance.

SUMMARY OF THE INVENTION

Systems, processes, and structures allow enhanced near-field testing of the uplink and/or downlink performance of MIMO wireless devices (DUT), such as for any of product development, product verification, and/or production testing. Channels may preferably be emulated to test the performance of a device under test (DUT) over a range of distances, within a near-field test environment. An enhanced process provides automated testing of a DUT over a wireless network, e.g. such as but not limited to a WLAN. The enhanced MIMO near-field test structures, systems, and processes may preferably be operated over a high dynamic range.

BRIEF DESCRIPTION OF THE DRAWINGS

FIG. 11 is a chart of test data for an RF Automation System (RAS);

FIG. 12 is a chart of test data for a first QC unit;

FIG. 13 is a chart of test data for a second QC unit;

FIG. 15 is a chart of test data for a RAS unit;

FIG. 16 is a chart of test data for a first QC unit;

FIG. 19 is a chart of test data for a Netgear access point (AP) router;

FIG. 20 is a chart of test data for a first access point (AP) QC unit;

FIG. 21 is a chart of test data for a second access point (AP) QC unit; and

DETAILED DESCRIPTION OF THE INVENTION

Figure 1:
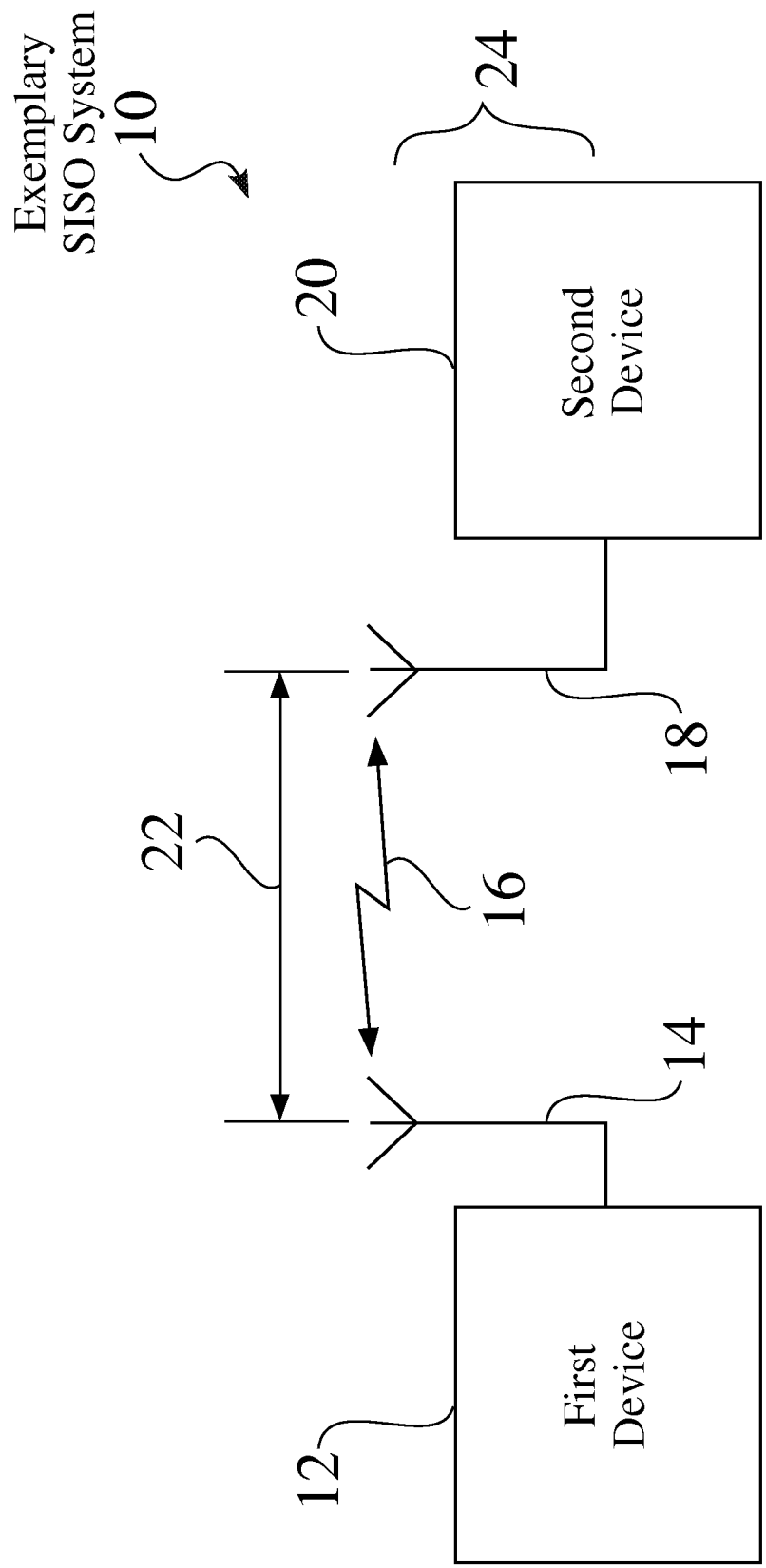
FIG. 1 is a schematic view of an exemplary SISO system.

FIG. 1 is a simplified schematic view of an exemplary single input, single output (SISO) system 10. A first device 12, e.g. a transmitter 12, transmits a wireless signal 16 from an antenna 14. The wireless signal 16 is received at an antenna 18 associated with a second, receiving device 20, which processes the signal 16, such as using signal processing circuitry and a microprocessor. Both the transmitter 12 and the receiver 16 in the SISO system 10 seen in FIG. 1 have a single antenna 14,18, and operate to either send or receive a single signal 16.

In the exemplary SISO system 10 seen in FIG. 1, one or both of the devices 12, 20 may moved in relation to the other device 20,12, such that the distance 22 between the antennas 14,18 may vary, such as between transmissions of wireless signals 16, and/or during a transmission of a wireless signal 16. While the distance 22 changes the time of flight of the wireless signal, the second device 20 can still receive and process the signal 16, as long as the signal 16 is not lost, e.g. such as from but not limited to path loss, i.e. path attenuation. Path loss may occur from a wide variety of conditions, such as but not limited to any of distance, reflection, refraction, diffraction, and/or absorption.

The performance of different SISO devices has readily been performed for many years, such as during any of design, development and production. Such testing may readily be performed at any distance 22, e.g. at any range between near-field and far-field. As SISO devices 12,20 comprise a single SISO channel 24, to send and/or receive a single wireless signal 22, there is inherently no difference due to distance, other than general signal attenuation.

Figure 2:
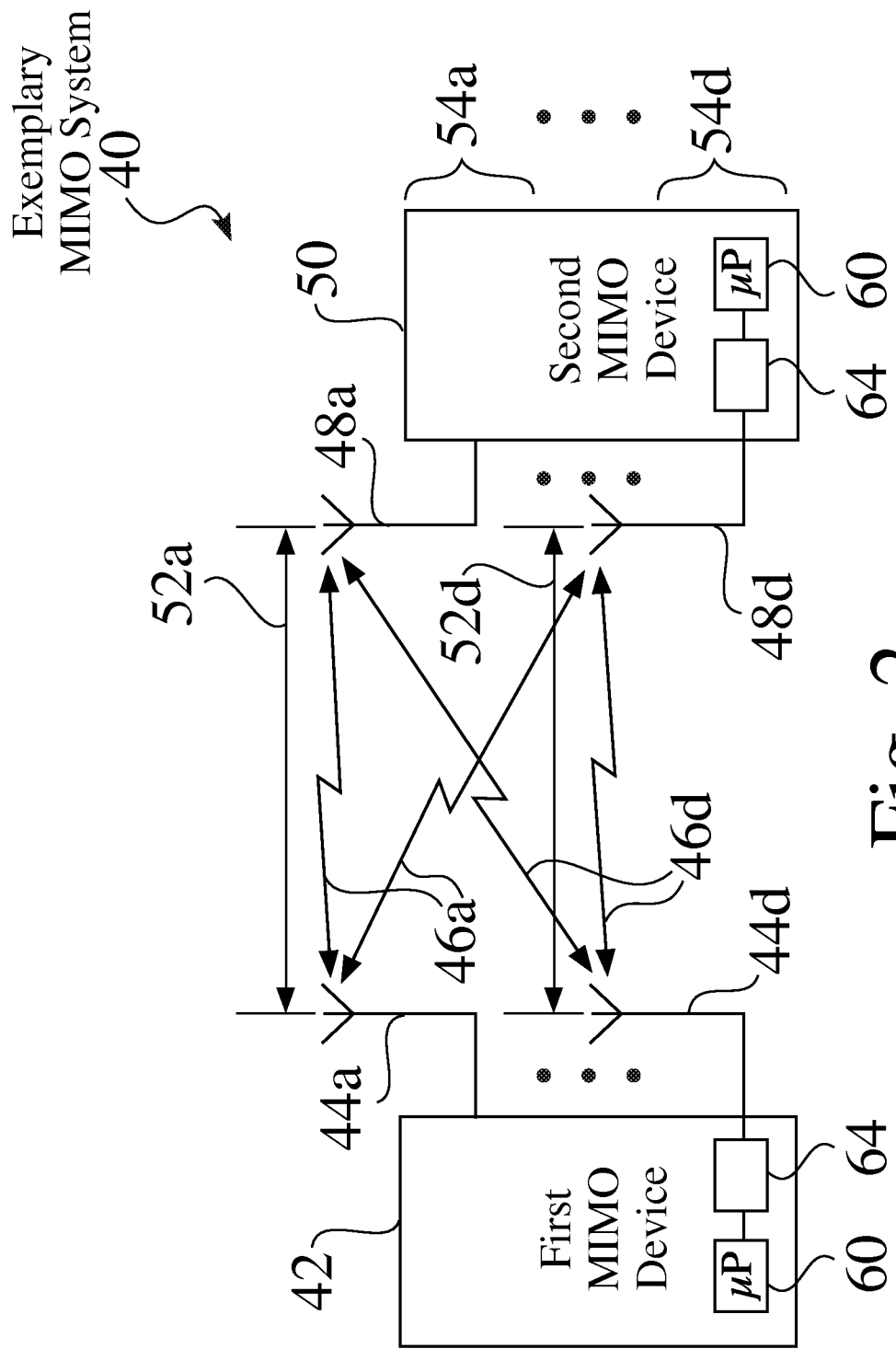
FIG. 2 is a schematic view of an exemplary MIMO system.

In contrast to the SISO system 10 seen in FIG. 1, FIG. 2 is a simplified schematic view of an exemplary multiple-input multiple-output (MIMO) system 40. A first MIMO device 42 transmits a plurality of wireless signals 46, e.g. 46a-46d from respective antennas 44, e.g. 44a-44d. The wireless signals 46 e.g. 46a-46d are typically received at a corresponding plurality of antennas 48, e.g. 48a-48d, associated with a second MIMO device 50, which processes the signals 46a-46n, such as using signal processing circuitry 64 and at least one microprocessor 60. Both MIMO devices 42,50 in the MIMO system 40 seen in FIG. 2 have a plurality of antennas 44,48, wherein the devices are configured to send or receive a plurality of signals 46, e.g. 46a-46d.

In the exemplary MIMO system 40 seen in FIG. 2, one or both of the devices 42,50 may be moved in relation to the other device 50,42, such that the distance 52, 52a-52d, between antennas 44,48 may vary, such as between transmissions of wireless signals 46, and/or during a transmission of a wireless signal 46. While the distance 52 changes the time of flight of the wireless signal 46, the receiving device 50 can still receive and process the signals 46, e.g. 46a-46n, as long as the signals 46 are not lost, e.g. such as from but not limited to path loss, i.e. path attenuation. Path loss may occur from a wide variety of conditions, such as but not limited to any of distance, reflection, refraction, diffraction, and/or absorption.

In contrast to SISO devices, e.g. 12, 20, the performance of MIMO devices, e.g. 42,50 is uniquely dependent on the simultaneous transmission of a plurality of signals 46 over a plurality of MIMO channels 54, e.g. 54a-54d, as well as on the distance 52, e.g. 52a-52d. For example, in a simplified MIMO system having two channels 54a and 54d, each device 42,50 comprises two radio channels 54 that are independent of each other. However, at the receiving end, each antenna 48a and 48d receives a composite signal 46a and 46d that includes the data from both signals 46a and 46d, e.g. "Data A" from a first signal 46a, and "Data B" from a second signal 46d, is received and "Data A plus B" at antennas 48a and 48d. Therefore, the receiver 50 is required to process the signals 46a and 46d to split the data, based on each corresponding channel 54a and 54d, to recapture the data, e.g. "Data A" at the first channel 54a and "Data B" at a second channel 54d, and prevent interference between the channels 54a and 54d.

Since the plurality of signals 52a and 52d are transmitted simultaneously in a MIMO system 40, the bandwidth is increased, e.g. such as to double the bandwidth as compared to an equivalent SISO system 10. Similarly, the addition of more channels, e.g. Three by Three (3×3) or Four by Four (4×4) MIMO systems 40, provides increased bandwidth, along with further processing requirements to split the combined and summed signals for the plurality of channels 54a-54d.

It is important to avoid interference and/or cancellation between channels 54a-54d, since the signals 52a-52d typically have the same frequency and amplitude. As well, since the receiving device, e.g. 50, receives each of the plurality of signals, e.g. 52a and 52d, simultaneously, the receiving device, e.g. 50 cannot identify which signal 52 is coming from which antenna 44, e.g. 44a or 44d.

Signal processing for the transmission and/or reception of MIMO signals 52 is typically performed by one more processors 60, i.e. chipsets 60 in the MIMO devices 42,50, wherein independent chipset vendors, commonly provide the chipsets, and all internal blocks.

Figure 3:
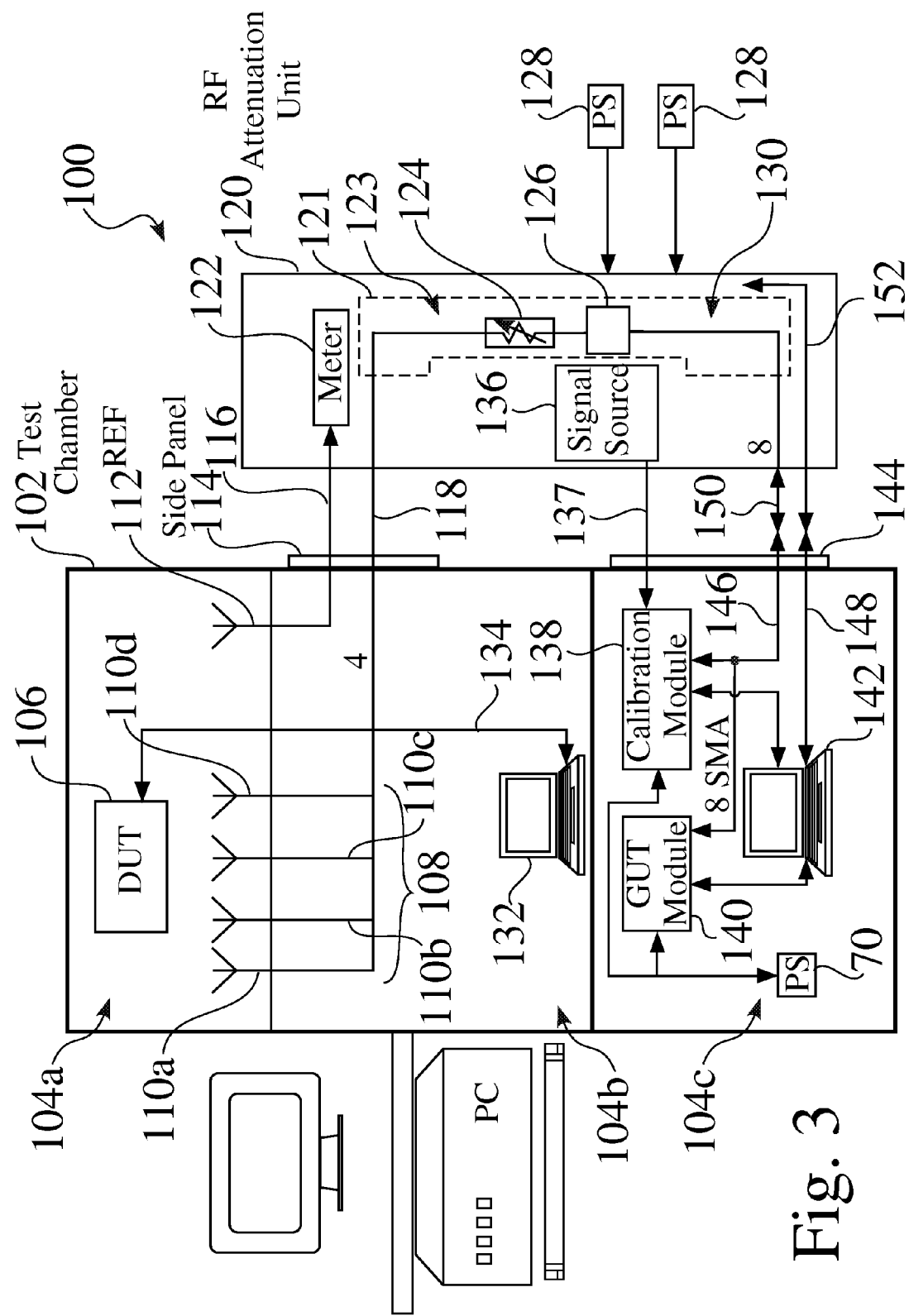
FIG. 3 is a schematic view of an exemplary enhanced near-field MIMO wireless test system.

FIG. 3 is a schematic view of an exemplary enhanced near-field MIMO wireless test system 100. A test chamber 102 comprises a first region 104a, a second region 104b, and a third region 104c. A device under test (DUT) 106 is locatable within the first test region 104a. The first test region may preferably comprise RF shielding, e.g. such as but not limited to any of double-walled steel, mesh, fabric, paint, and/or foam.

The enhanced near-field MIMO wireless test system 100 provides a standard system and emulation model to adequately test the performance of MIMO devices 106, both for near-field performance and far-field performance. For example, in some embodiments 100, far-field performance of a MIMO device 106 may preferably be emulated within a near-field MIMO test system 100.

An antenna matrix 108 comprises a plurality of test antennas 110, e.g. 110a-110d, which are located in and extend 118 from the first test chamber 104a. The antenna matrix 108 is connected 118 to an RF attenuation unit 120. Furthermore, a reference antenna (REF) 112 is located in and extends 116 from the first test region 104a, and is then connected to meter 122 within the RF attenuation unit 120. In a current system embodiment, the meter 122 comprises an RF & Microwave power meter 122, which provides simultaneously scanning multichannel measurement, for self-calibration of the enhanced near-field MIMO wireless test system 100.

Each of the antennas 110, e.g. 110a-110d, in the antenna matrix 108 preferably comprises a time division duplexing (TDD) antenna 110, which applies time-division multiplexing, e.g. such as to separate outward (uplink) signals 52 and return (downlink) signals 52.

For example, in a four-by-four setup, each DUT 106 comprises four time-division multiplexed (TDM) antennas 44, wherein each of the device antennas 44a-44d is configured to both transmit uplink signals 46 and receive combined downlink signals 46. For such a four-by-four configuration, to test the MIMO performance of the DUTs 106, each of the four test antennas 110a-110d in the test system 100 is configured to both receive combined uplink signals 46, and transmit downlink signals 46, which are preferably attenuated and combined to simulate one or more distances 52 between the test antennas 110 and the device antennas 44a-44d. The test antennas 110a-110d comprise part of the test system 100, and typically comprise standard MIMO antennas inside the DUT test region 104a.

The antenna matrix 108 provides input paths 118 (FIG. 5), e.g. four paths 118a-118d for a 4×4 DUT 106 and a 4×4 MIMO test system 100, that are connected to a signal processing circuit 121, such as through a input signal processing assembly 123, wherein the signal processing circuit 121 comprises a programmable attenuator assembly 124.

The programmable attenuator assembly 124 typically comprises a plurality of programmable attenuators, e.g. 124-124d (FIG. 4, FIG. 5), corresponding to each of a plurality of antenna paths 118.

Each of the programmable attenuators 126 is configured to simulate real-world distance for each of the plurality of antenna paths 118a-118d. For example, on a current MIMO test system embodiment 100, the programmable attenuators 126 may preferably be configured any distance from Zero meters to one or more kilometers.

Figure 4:
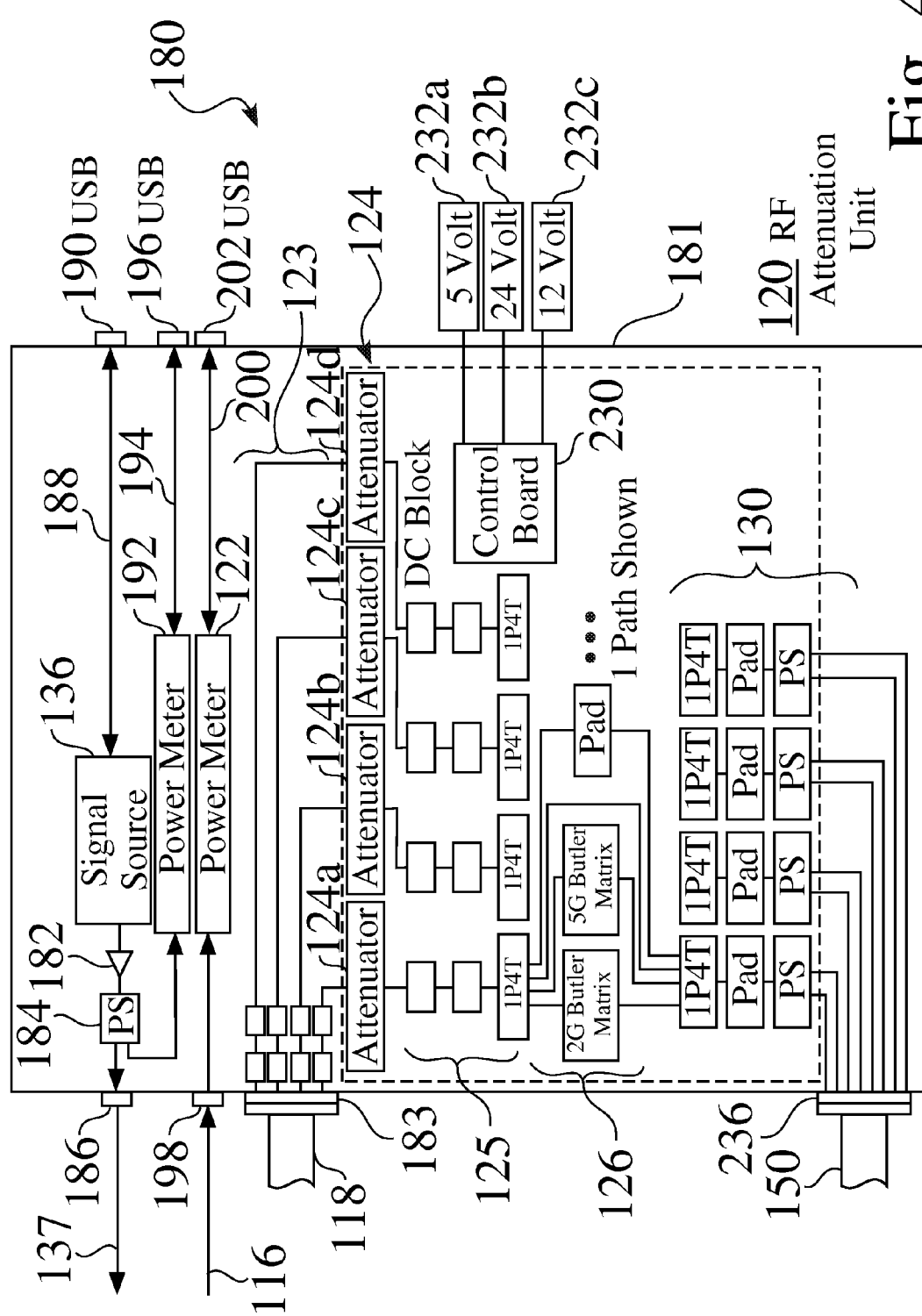
FIG. 4 is a schematic diagram of an exemplary RF attenuation unit for a near-Field MIMO wireless test system.
Figure 5:
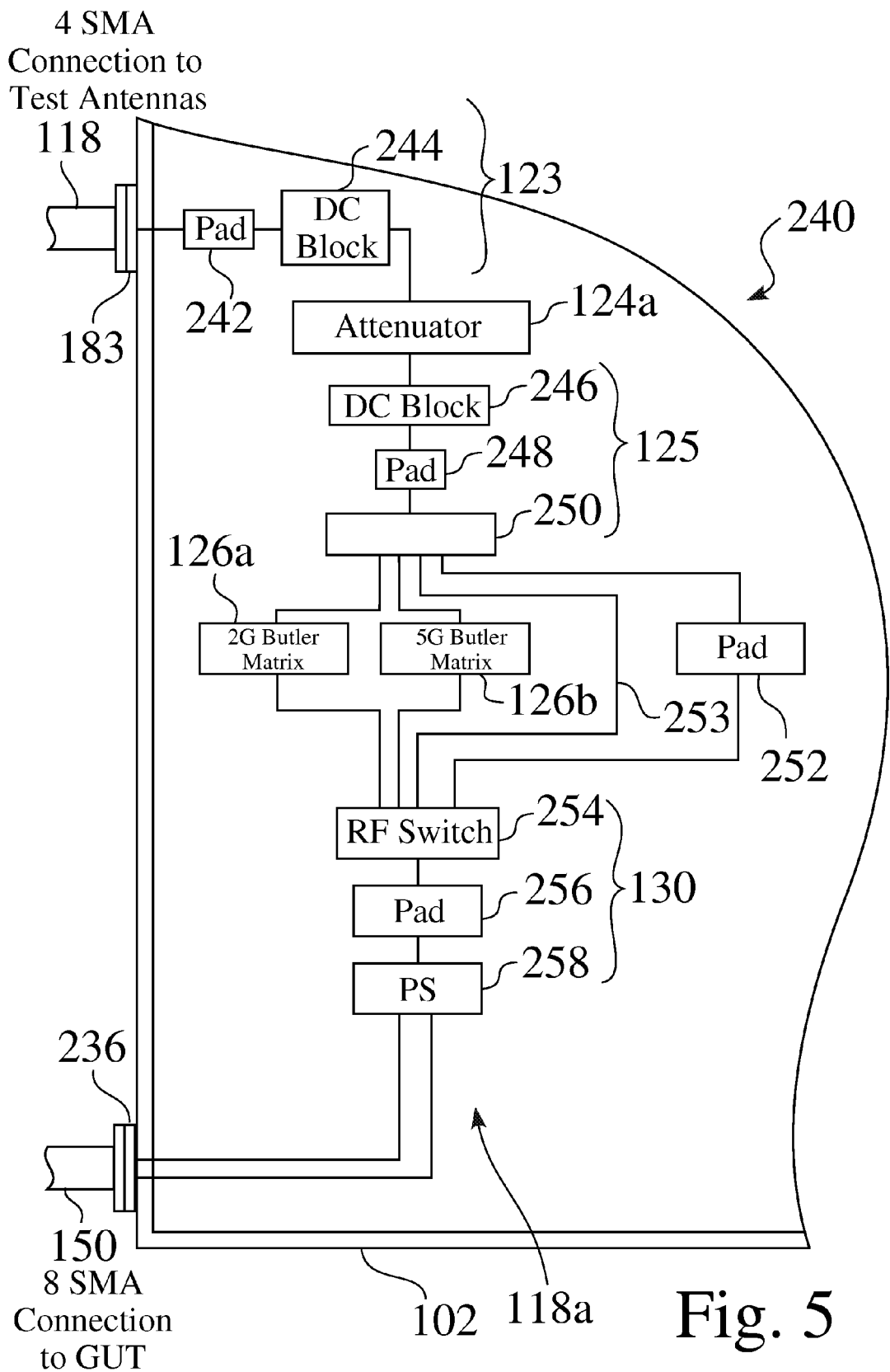
FIG. 5 is a detailed partial schematic diagram of one path within an RF attenuation unit, between an inlet port that is connectable to one or the channel antenna, and an outlet port that is connectable to a Golden Unit Under Test (GUT) module.

The programmable attenuator 124 is connected to at least one Butler matrix 126, which is configured to combine the plurality of MIMO signals, to emulate one or more real-world conditions, e.g. emulating the combined MIMO signal for a plurality of distances. In some system embodiments 100, the system 100 is configured to provide selectable switching between Butler matrix blocks 126, such as between a 2.4 gigahertz block 126a (FIG. 4, FIG. 5) and a 5 gigahertz block 126b (FIG. 4, FIG. 5).

The system 100 is therefore preferably configured to adjust the attenuation, which simulates the distance 52, e.g. 52a,52b, between the device under test 106 and the test antennas 110. The attenuation may preferably be programmed digitally, and may preferably be varied, such as independently or in tandem.

The output of the Butler matrix assembly 126 is connected, such as through an output signal processing assembly 130, to an output port 236 (FIG. 4), which is connectable 150,146 to a calibration module 138, or to a GUT module 140, such as located within the third test region 14c.

A signal source 136, such as located in the RF attenuation unit 120, is also connectable 137 to the calibration module 138. In some current system embodiments 10, the signal source 136 comprises a Lab Brick LSG Series Signal Generator, e.g. Model LSG-02, available through Vaunix Technology Corporation, of Haverhill, Mass., having a frequency range from 20 MHz to 6 GHz. For calibration, the signal source 136 is configured to generate a continuous-wave (CW) signal at desired frequency, which is pumped into the antenna matrix 118, i.e. the antenna chain 118, and then matched using the power meters 192, 122.

The exemplary test system 100 seen in FIG. 3 comprises a 4×4 QC test station 100, for testing the near field performance of a 4 channel MIMO device 106. The enhanced system 100 and associated process 340 (FIG. 8) provides testing, within a small, i.e. near-field, form factor, while emulating a significantly larger, i.e. far-field, environment, wherein the system 100 accurately determines the performance of a DUT 106 in a real-world MIMO environment.

In the exemplary test system 100 seen in FIG. 3, one or more of the cables between components, e.g. 116,118, 137, 146, etc. may preferably comprise coaxial RF coaxial cables, with suitable connectors, such as but not limited to Sub-Miniature version A (SMA) connectors. Other electrical connections, such as but not limited to signal connections between components located within the third region 14c of the test chamber 102, may comprise RJ45 wiring and connectors.

FIG. 4 is a schematic diagram 180 of an exemplary RF attenuation unit 120, such as for a near-field MIMO wireless test system 100. The exemplary RF attenuation unit 120 seen in FIG. 4 is mounted within an enclosure 181. FIG. 5 is a detailed partial schematic diagram 240 of one path 118 within an RF attenuation unit 120, between an inlet port 183 that is connectable to the antenna matrix 108, and an outlet port 236 that is connectable to the calibration module 138 and the GUT module 140.

Figure 6:
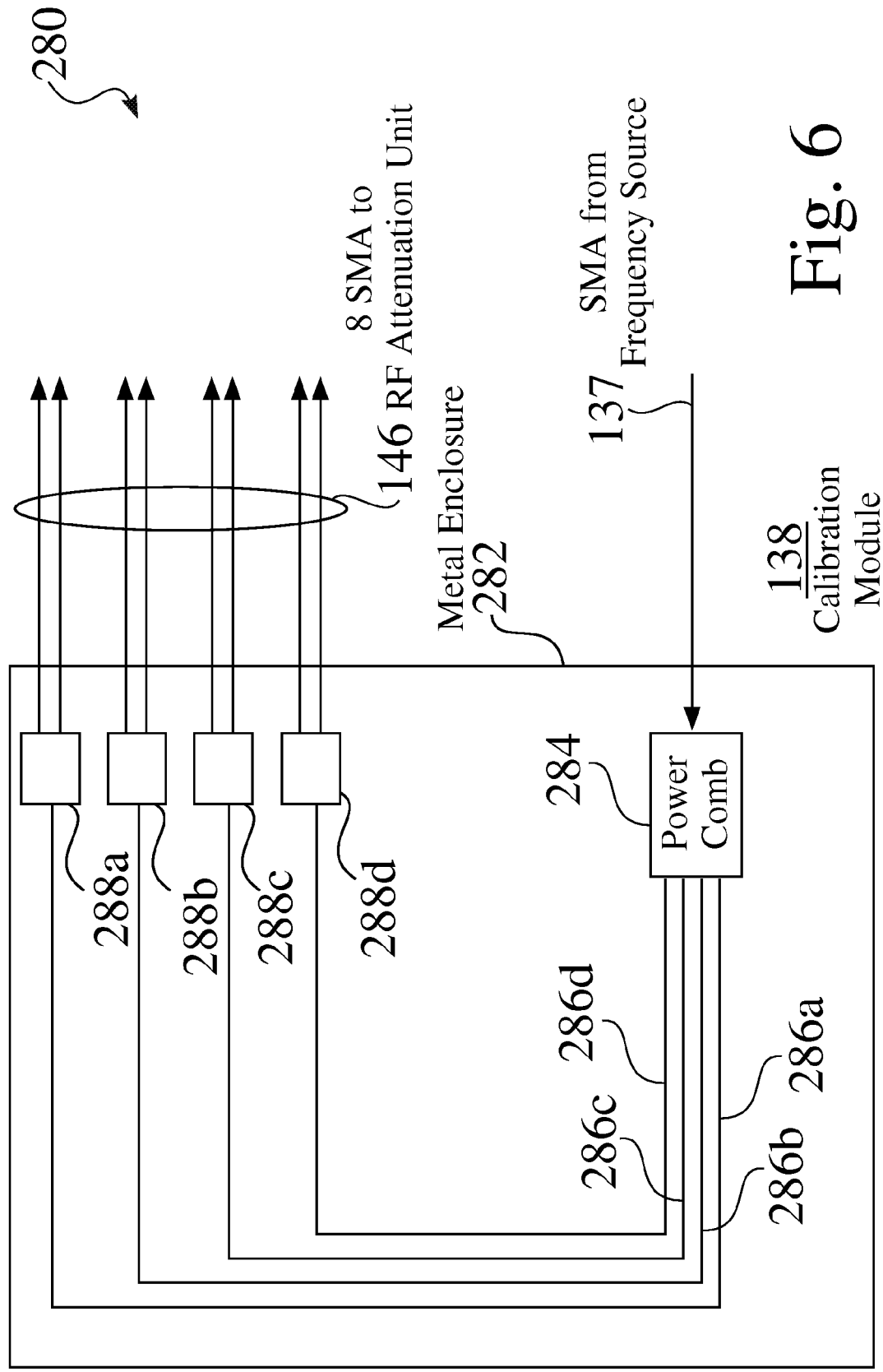
FIG. 6 is a schematic diagram of an exemplary calibration module for a near-field MIMO wireless test system.

As seen in FIG. 4, an input of the signal source 136 is connected 188 to a USB port 190. The output of the signal source 136 is connected to an RF amplifier 182, which feeds into a PS element 184. In a current exemplary system 100, the RF amplifier 182 comprises a wide band power amplifier 182. The PS element 184 is then connected to an output 186, which is connectable 137 to the calibration module 138 (FIG. 2, FIG. 6). The PS element 184 is also connected to a power meter 192, which is connected 194 to a corresponding USB port 196.

As also seen in FIG. 4, the reference antenna cable 116 is connectable to a reference input port 198, which is connected to a reference signal power meter 122. The reference signal power meter 122 is also connected 200 to a corresponding USB port 202. In a current system embodiment, the power meters 122 and 192 comprise RF & Microwave power meters.

The exemplary signal processing circuit 121 seen in FIG. 4 and FIG. 5 comprises a input signal processing assembly 123 between the input port 183 and the programmable attenuators 124. In some embodiments, the input signal processing assembly 123 comprises a Pad 242 and a DC block 244 corresponding to each antenna 110, e.g. 110a-110d, of the test antenna matrix 108, which are connected to a corresponding attenuator module for each signal path. In some current embodiments, the programmable attenuators 124, e.g. 124a-124d, comprise solid state programmable attenuators, such as Model No. 50P-1857, available from JFW Industries, Inc. of Indianapolis, Ind.

The exemplary signal processing circuit 121 seen in FIG. 4 and FIG. 5 also comprises a post attenuation processing assembly 125 between the programmable attenuation elements 124, e.g. 124a, and one or more corresponding butler matrix modules 126. In some embodiments, the post attenuation processing assembly 125 comprises a DC block 246, a Pad 248, and eight RF switch elements 250. In some current embodiments, the RF switch elements 250 comprise single pole multiple throw (SPnT) RF switches.

As seen in FIG. 4 and FIG. 5, the each signal path 240 in a signal processing circuit 121 may comprise one or more Butler matrix modules 126, e.g. 126a,126b. For example, a first Butler matrix module 126a seen in FIG. 5 comprises a 4×4 module for 2G operations. In an exemplary current embodiment, the first Butler matrix module 126a comprises a Model BC44-30 module, available through Emhiser Tele-Tech, Incorporated, of Belgrade, Mont. As well, the second Butler matrix module 126b seen in FIG. 5 may preferably comprise a 4×4 module for 5G operation, which in one current embodiment comprises a Model BC44-31 module, also available through Emhiser Tele-Tech, Incorporated. In addition, the signal processing circuit 121 may further comprise an RF attenuation pad element 252 and/or a matrix bypass connection 253.

The exemplary signal processing circuit 121 seen in FIG. 4 and FIG. 5 also comprises an output signal processing assembly 130 between the Butler Matrix assembly 126 and the output port 236, such as comprising but not limited to eight RF switch elements 254, a Pad element 256, and a PS element 258. In some current embodiments, the RF switch elements 254 comprise single pole multiple throw (SPnT) RF switches. The Pad element 256 typically comprises an RF attenuation pad, such as to reduce the level of the output signal to an acceptable level for input to any of the calibration module 138 or the GUT module 140.

The RF switch elements 250 and 254 allow the exemplary 100 embodiment seen in FIG. 4 and FIG. 5 to be controllably switched between modules in the Butler Matrix Assembly 126, e.g. between any of the first Butler matrix module 126a, the second Butler matrix module 126b, the RF attenuation pad element 252, or the matrix bypass connection 253, for each of the antenna paths 118.

As further seen in FIG. 4, the RF attenuation module 120 further comprises a control board 230, having one or more power inputs 232, e.g. a 5 volt DC supply 232a, a 24 volt DC supply 232b, and/or a 12 volt DC supply 232c. The control board 230 controls several modules within the RF attenuation module 124, such as comprising any of the relays, the attenuators 124, and any switching that is required between components and paths 118.

In some system embodiments 100, the control board 230 is configured to provide selectable switching between Butler matrix blocks 126, such as between a 2.4 gigahertz block 126a (FIG. 4, FIG. 5) and a 5 gigahertz block 126b (FIG. 4, FIG. 5). As well, the control board 230 may preferably be configured to provide simultaneous operation at a plurality of frequencies, e.g. simultaneous 2.4 gigahertz and 5 gigahertz operation.

FIG. 6 is a schematic diagram 280 of an exemplary calibration module 138 for a near-field MIMO wireless test system 100, which typically comprises a metal enclosure 282. A 4-Way power divider 284, i.e. a power comb 284, is mounted within the enclosure 282, and is connected 137 to the signal source 136 at the attenuation module 124. In an exemplary current system embodiment 100, the 4-Way Power Divider 284 comprises an RF power divider/combiner, which is rated at a frequency range of 2 GHz to 8 GHz. Outputs 286, e.g. 286a-286d for a 4×4 system 100, extend from the power divider 284 to corresponding splitter/combiner modules 288, e.g. 288a-288d. In a current system embodiment 100, the splitter/combiner modules 288a-288d comprise RF power divider/combiners.

The calibration module 138 allows automated calibration for the enhanced test system 100, using a known sample signal from the frequency source 136. The known signal is transmitted 146,150 into all four paths 118, e.g. 118a-118d, via the power comb 284 and splitter/combiners 288. The RF switches 250 and 254 (FIG. 5) are then controlled, to deactivate or turn off all but one of the paths 118. For example, three paths 118b-118d are turned "OFF", to terminate the corresponding signals, while the remaining path 118a is turned "ON". The chosen "ON" path 118, e.g. 118a, carries the signal from the frequency source 136, through the switches 250, the butler matrix 126, the pads 248, the corresponding attenuator 124, e.g. 124a, and up to the corresponding antenna 110, e.g. 110a, in the test chamber 104a.

Using the power meter 192 (FIG. 4), the signal is measured at the source going into 137 the calibration module 138. Using the same power meter 192, or a second power meter 22, the signal is measured at the reference antenna 112 in the test chamber 104a. These two measurements, when added, supply the path loss for the tested path 118, e.g. 118a. As the signal is known, the sent and received signal may be compared to the original signal, which is used as a reference.

The same process is repeated for each of the other three paths 118, e.g. 118b-118d, by varying the frequency source 136 to the desired channel frequency, and selecting the path 118 to be calibrated.

Figure 7:
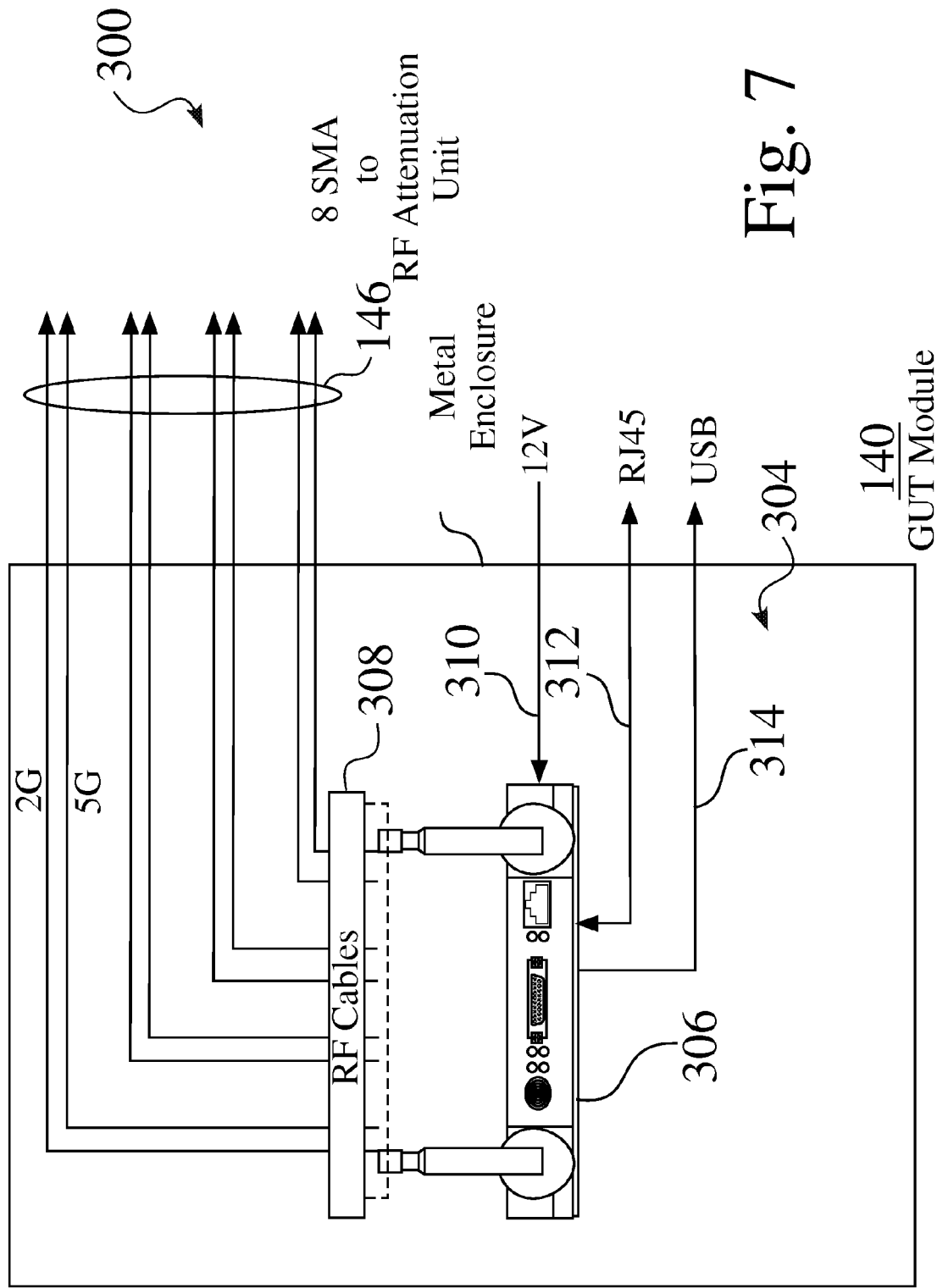
FIG. 7 is a schematic diagram of an exemplary GUT module for a near-field MIMO wireless test system.

FIG. 7 is a schematic diagram of an exemplary GUT module for a near-field MIMO wireless test system 100, which comprises a metal enclosure 302 having an interior region 304 defined therein. A golden unit under test (GUT) 306 comprises a wireless MIMO device 306 that is known to meet all required performance parameters, which can therefore provide a throughput mask, comprising the minimum allowed throughput in Mbps at each attenuation or range level, by which to compare the performance of a device under test 106.

As seen in FIG. 7, a golden unit under test (GUT) 306 is located within the interior region 304 of the GUT module enclosure. Signal cables 308 are connected to the GUT 306, such as to connect 146, e.g. through 8 SMA connectors 146, to the RF attenuation unit 120. In some embodiments, the signal cables 308 comprise RF cables 308, e.g. RF interface cables. Other connections are also made to the GUT device 306, such as a power connection 310, e.g. 12 volts DC, an RJ45 connector 312, and a USB connection 314.

The enhanced MIMO test system 100 may be configured in a wide variety of sizes, such as for but not limited to testing 3×3 and/or 4×4 MIMO devices 106. For example, an enhanced MIMO test system 100 that is configured to design and/or development may have a relatively large first region 104a, such as having a volume of about 27 cubic meters, e.g. having 3 meter sides. The enhanced MIMO test system 100 can readily emulate a real-world environment, and can also compensate for differences within the test environment. Therefore, for production testing, the enhanced MIMO test system 100 may readily be configured with a smaller, i.e. near-field, form factor, such as to decrease the cost and/or complexity of the chamber.

Each of the embodiments of the enhanced MIMO test system 100 provide adequate multipart capabilities, within a physical environment having reduced interference, to maximize the performance validation for devices under test 106.

Figure 8:
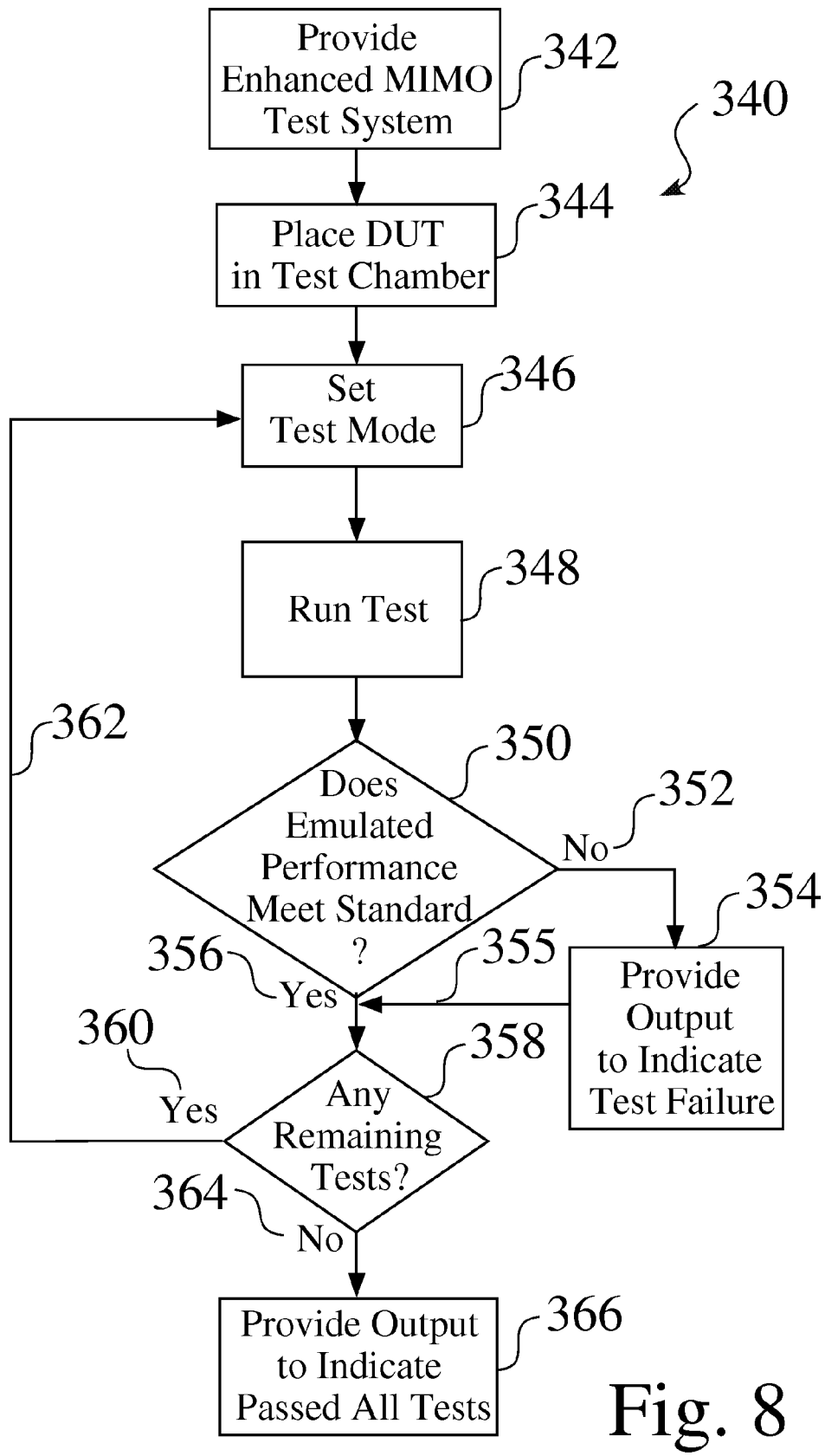
FIG. 8 is a flowchart of an exemplary process for emulating system performance.

FIG. 8 is a flowchart of an exemplary process 340 for emulating system performance of a device under test DUT 106. At step 342, an enhanced MIMO test system 100 is provided, which is configured to emulate any of the uplink or downlink operation of the DUT 106 over a plurality of distances, e.g. from near-field to far-field.

At step 344, a MIMO device to be tested DUT 106 is placed within the first region 104a of the test chamber 102, and is connected to a power supply and other leads, e.g. such as but not limited to test signal inputs, and/or signal outputs. One or more operation modes of the DUT and/or the system 100, may be set at step 346, such as based upon a frequency mode, an emulated distance, or other operation modes.

At step 350, the system 100 determines if the measured performance of the DUT 106 is acceptable for the tested mode, e.g. such as by measuring path loss 402 (FIG. 9) and throughput 404 (FIG. 9) of the DUT 106. If the performance determination 350 is negative 352 for the tested mode 346, such as if the measured performance does not meet pass-fail criteria, the system 100 may provide an output 354 to indicate the failure, such as but not limited to a printed output, a displayed output, a light, a sound, or other indication.

In some system embodiments 100, such as for prototyping and/or product development or troubleshooting, it may be desirable for a device 106 that fails one test 348 to continue 355 to be tested for other modes, or to be modified or repaired and retested. In production, further testing may cease if a DUT 106 fails any test, wherein the unit may be any of diverted, tagged, or rejected.

If the performance determination 350 is positive 356 for the tested mode 346, such as if the measured performance meets pass-fail criteria, a determination 358 may be made whether there are any more remaining tests or modes that need to be performed on the DUT 106. If so 360, the process 340 may preferably return 362, e.g. such as to select 346 and test 348 another mode. If all tests are completed 364, the system 100 may preferably provide an output 366 to indicate the success, such as but not limited to a printed output, a displayed output, a light, a sound, or other indication.

Figure 9:
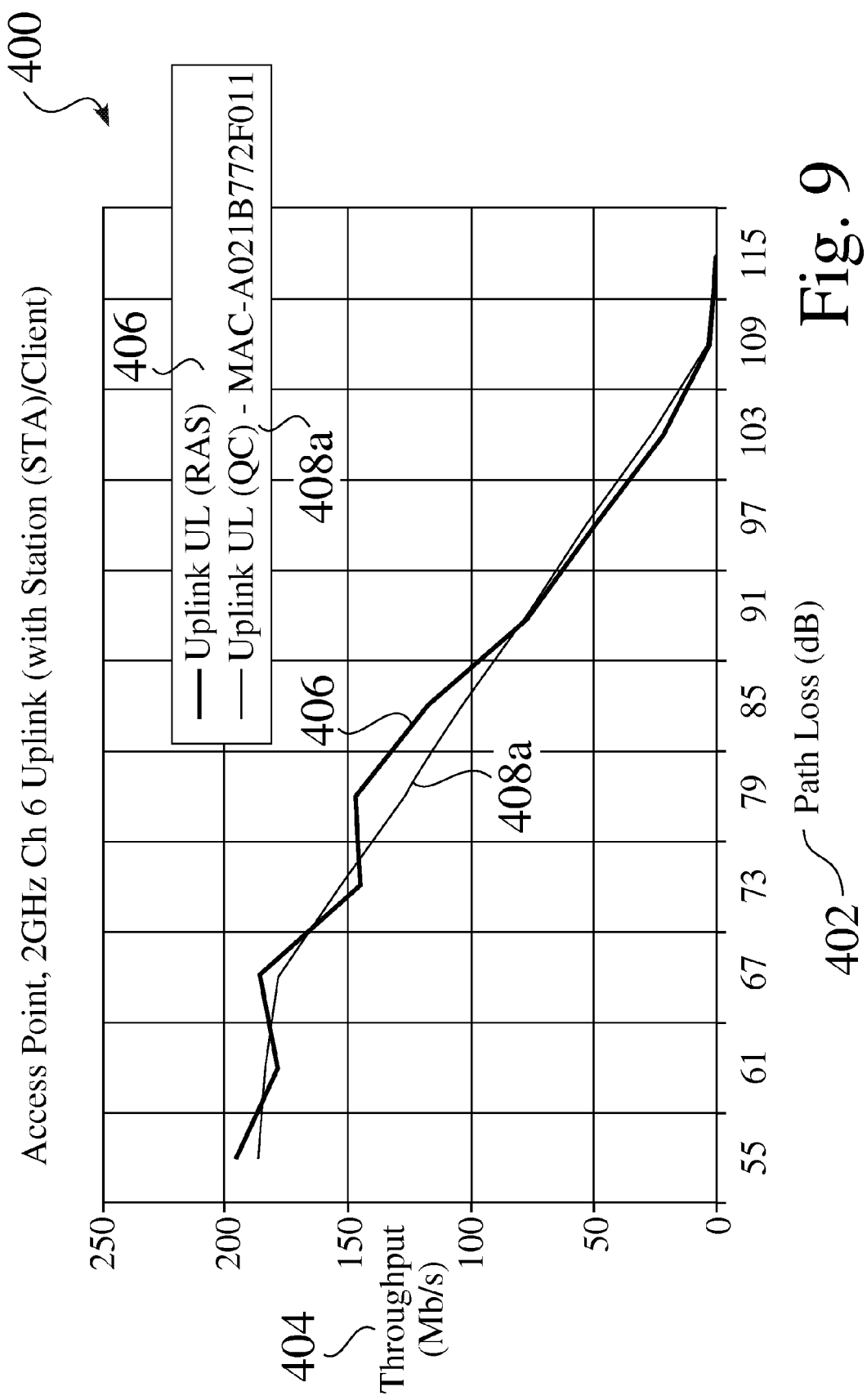
FIG. 9 is a chart that shows throughput as a function of path loss for a 2 GHz Channel 6 Uplink (with a station (STA)/Client)

FIG. 9 is a chart 400 that shows a comparison between throughput 404 as a function of path loss 402 for a first exemplary device under test 106a, as compared to expected performance data, wherein the first exemplary device under test 106a comprises an N750 wireless dual band Gigabit router access point (AP), available through Netgear Inc., of San Jose, Calif., which is configured to run both 2.4 GHz and 5 GHz bands concurrently. The first plot 406 in FIG. 9 shows the expected Uplink throughput 404, in Mb/s) as a function of path loss 402 (in dB) for an RAS reference device, e.g. a GUT 306, or data. The second plot 408a in FIG. 9 shows the uplink throughput 404, in (Mb/s) as a function of path loss 402 (in dB) for a device under test 106, such as for quality control (QC) testing that may preferably be performed at a production location.

Figure 10:
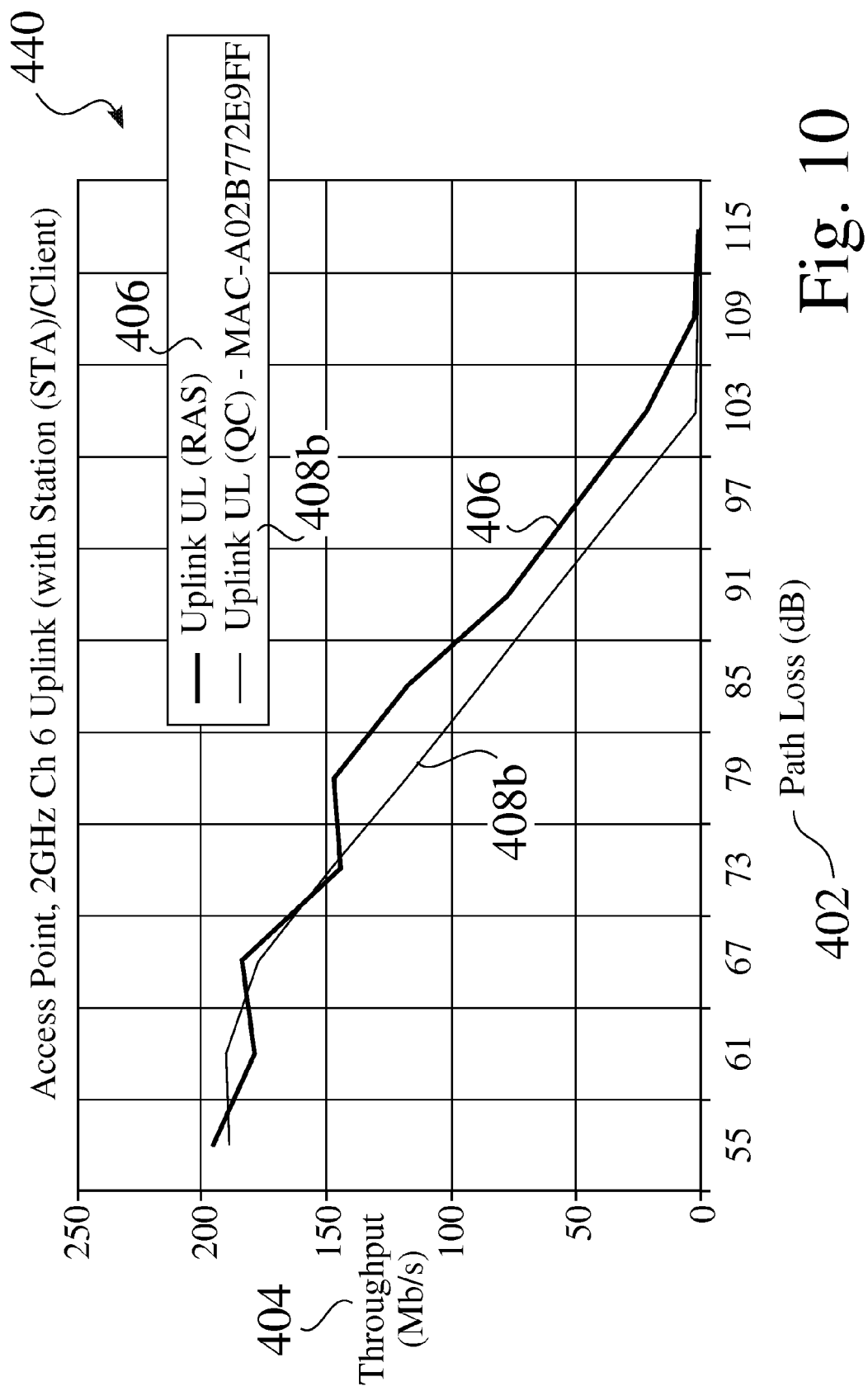
FIG. 10 is a second chart that shows throughput as a function of path loss for a 2 GHz Channel 6 Uplink (with a station (STA)/Client)

FIG. 10 is a second chart 440 that shows a comparison between throughput 404 as a function of path loss 402 for a second exemplary device under test 106b, as compared to expected performance data, wherein the second exemplary device under test 106b also comprises a Netgear N750 wireless dual band Gigabit router. The first plot 406 in FIG. 10 shows the expected Uplink throughput 404, (in Mb/s) as a function of path loss 402 (in dB) for the RAS reference device, e.g. a GUT 306, or data, such as also shown in FIG. 9. The second plot 408b in FIG. 10 shows the uplink throughput 404, (in Mb/s) as a function of path loss 402 (in dB) for a second device under test 106, such as for quality control (QC) testing.

As seen in FIG. 9 and FIG. 10, the resultant performance between comparable devices under test 106 yields test data that can be compared to the reference data 406, to determine which devices under test 106 meet, or fail to meet, a threshold level of performance. FIG. 11 is a chart 460 of test data for an RF Automation System (RAS), e.g. a GUT 306. FIG. 12 is a chart 480 of test data for the first device under test 106a, such as for quality control (QC) testing. FIG. 13 is a chart 500 of test data for the second device under test 106a, such as for quality control (QC) testing. In some system embodiments, any of the plots 406, 408 or the data may be provided, such as for any of output, storage, or display. As discussed, above, an automated result, e.g. pass or fail, may be provided based on the results of one or more test.

Figure 14:
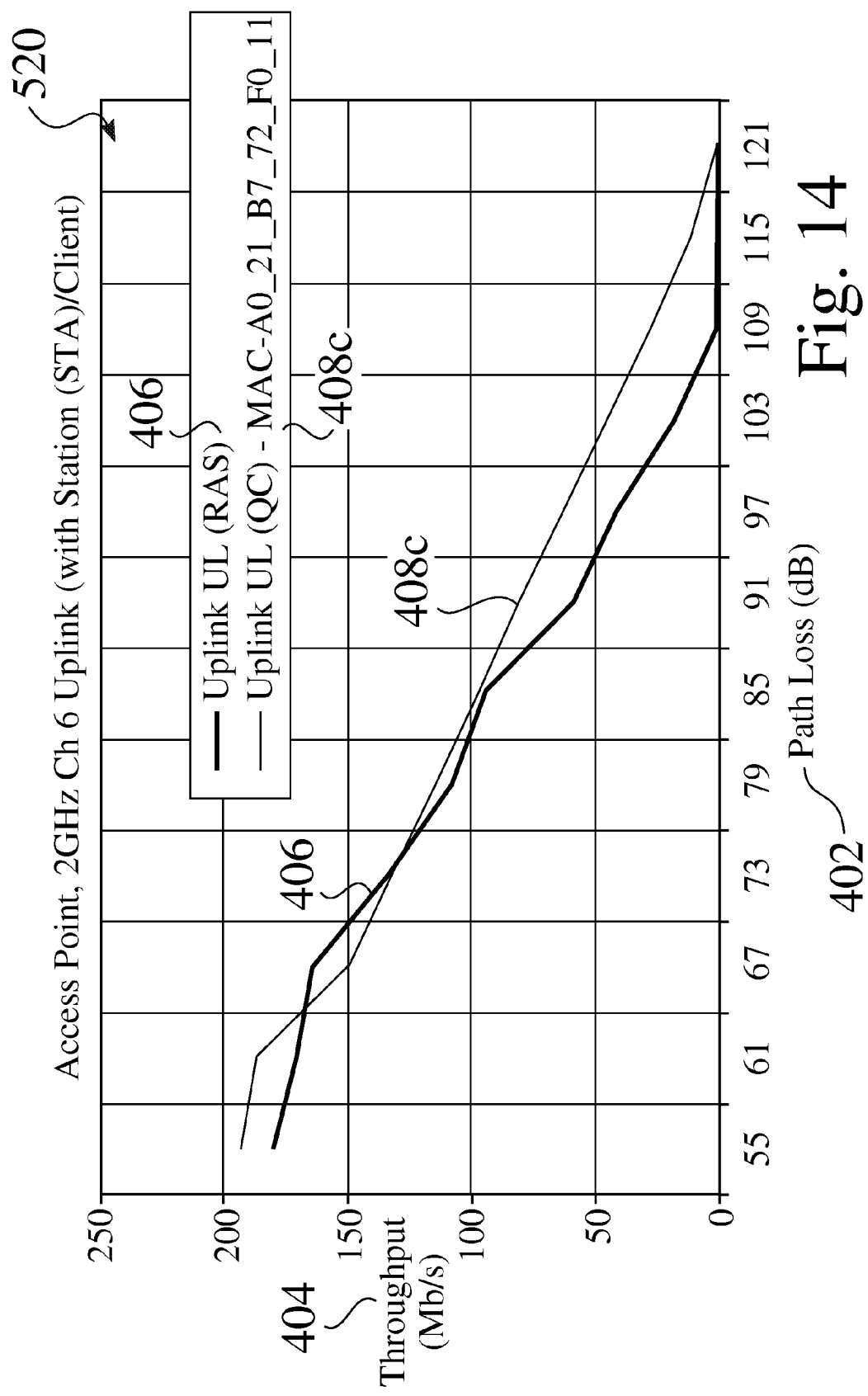
FIG. 14 is a chart that shows throughput as a function of path loss for a 2 GHz Channel 6 RAS and QC uplinks (with a station (STA)/Client)

FIG. 14 is a chart 520 that shows a comparison between throughput 404 as a function of path loss 402 for a third exemplary device under test 106, e.g. 106c, as compared to expected performance data, wherein the second exemplary device under test 106c also comprises a Netgear N750 wireless dual band Gigabit router. The first plot 406 in FIG. 14 shows the Uplink throughput 404, (in Mb/s) as a function of path loss 402 (in dB) for the RAS reference device, e.g. a GUT 306, or data. The second plot 408c in FIG. 14 shows the uplink throughput 404, (in Mb/s) as a function of path loss 402 (in dB) for a third device under test 106, e.g. 106c, such as for quality control (QC) testing. FIG. 15 is a chart 540 of test data for an RAS reference device, e.g. a GUT 306. FIG. 16 is a chart 560 of test data for the third device under test 106c, such as for quality control (QC) testing.

Figure 17:
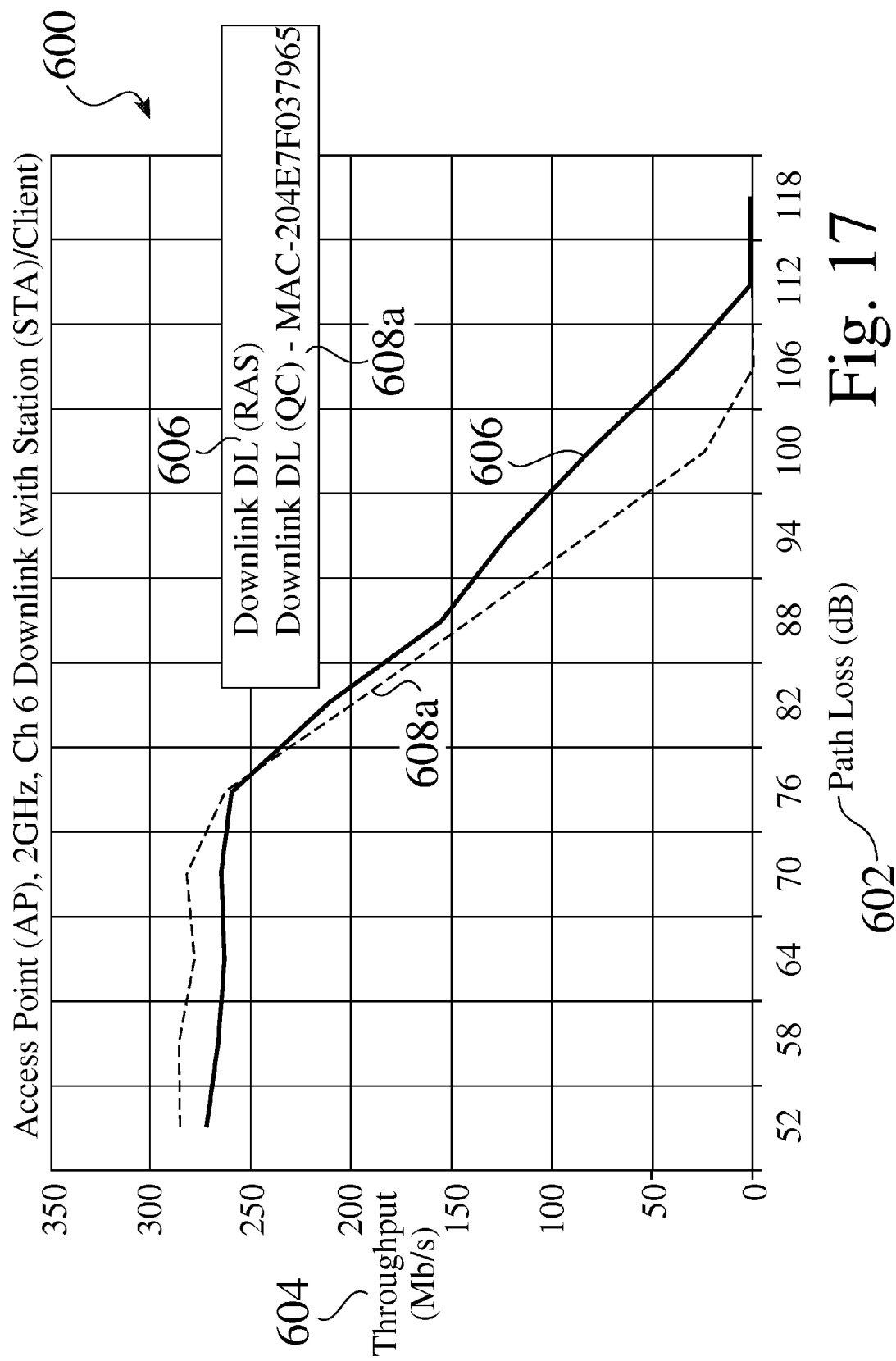
FIG. 17 is a chart that shows throughput as a function of path loss for 2 GHz Channel 6 RAS and QC downlinks (with a station (STA)/Client)

FIG. 17 is a chart 600 that shows a comparison between downlink throughput 604 as a function of path loss 602 for an exemplary device under test 106d, as compared to expected performance data, wherein the exemplary device under test 106d comprises an N900 wireless Dual Band Gigabit router access point (AP), available through Netgear Inc., of San Jose, Calif., which is configured provide up to 900 Mbps of combined throughput (rated at 450 Mbps for each channel). The first plot 606 in FIG. 17 shows the expected downlink throughput 604, in Mb/s) as a function of path loss 602 (in dB) for an RAS reference device, e.g. a GUT 306, or data. The second plot 608a in FIG. 17 shows the downlink throughput 604, in (Mb/s) as a function of path loss 602 (in dB) for an exemplary device under test 106d, such as for quality control (QC) testing, which may preferably be performed at a production location.

Figure 18:
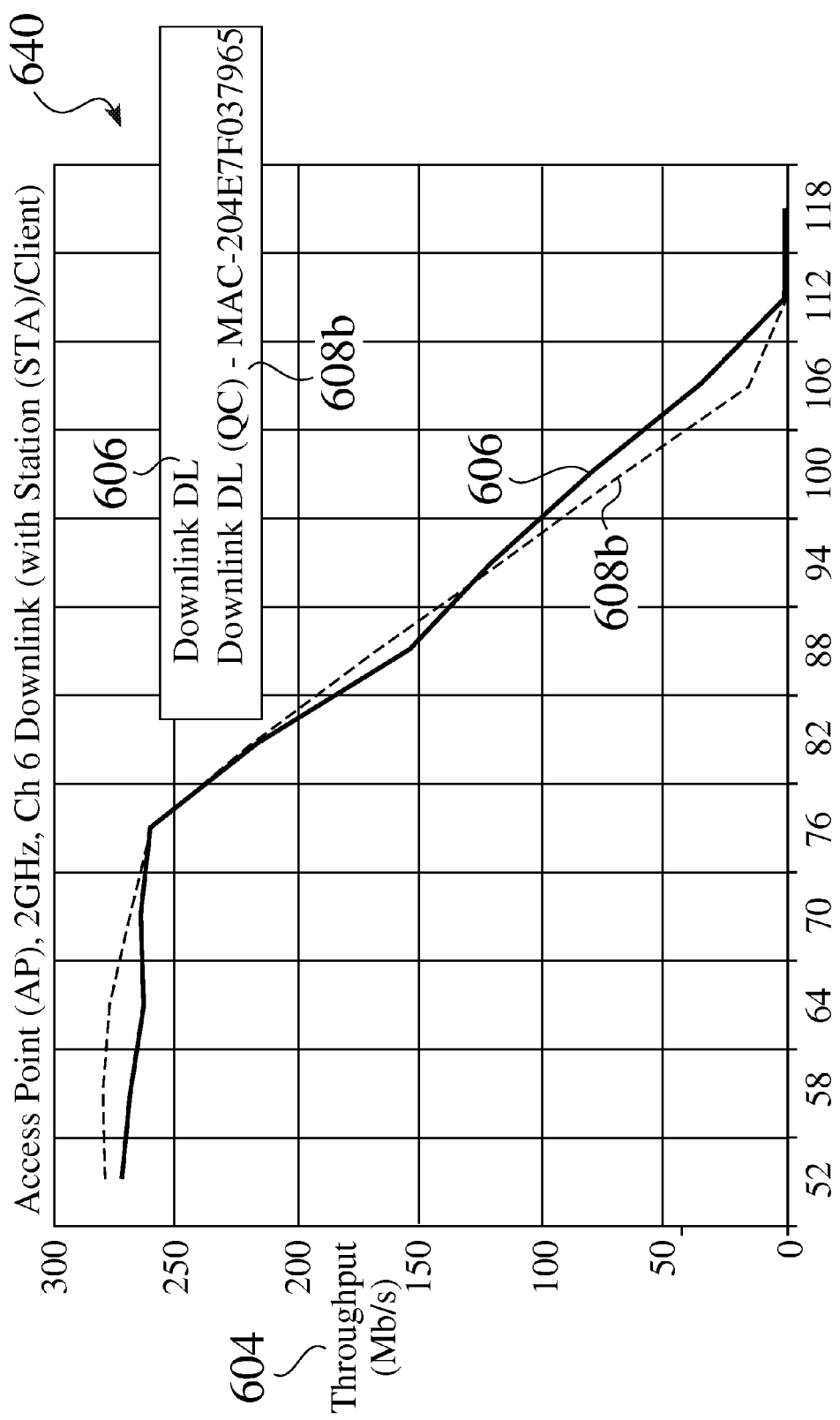
FIG. 18 is a chart that shows throughput as a function of path loss for 2 GHz Channel 6 downlinks (with a station (STA)/Client)

FIG. 18 is a chart 640 that shows a comparison between downlink throughput 4604 as a function of path loss 4602 for an alternate exemplary device under test 106e, as compared to expected performance data, wherein the second exemplary device under test 106e also comprises a Netgear N900 wireless dual band Gigabit router. The first plot 606 in FIG. 18 shows the expected downlink throughput 604, (in Mb/s) as a function of path loss 602 (in dB) for the RAS reference device, e.g. a GUT 306, or data, such as also shown in FIG. 17. The second plot 608b in FIG. 18 shows the downlink throughput 604, (in Mb/s) as a function of path loss 602 (in dB) for the alternate exemplary device under test 106e, such as for quality control (QC) testing.

As seen in FIG. 17 and FIG. 18, the resultant downlink performance between comparable devices under test 106d, 106e yields test data 608a,608b that can be compared to the reference data 606, to determine which devices under test 106 meet, or fail to meet, a threshold level of performance.

FIG. 19 is a chart 700 of test data for a Netgear N900 wireless dual band Gigabit router RAS reference device, e.g. a GUT 306. FIG. 20 is a chart 720 of test data for a first Netgear N900 wireless dual band Gigabit router, such as for quality control (QC) testing. FIG. 21 is a chart 740 of test data for a second Netgear N900 wireless dual band Gigabit router, such as for quality control (QC) testing. In some system embodiments, any of the plots 606, 608 or the data may be provided, such as for any of output, storage, or display. For example, as seen in FIG. 18, the second Netgear N900 wireless dual band Gigabit router DUT 106e provides near-field and far-field downlink performance 608b, as emulated in the enhanced test system 100, that may be relatively consistent with the reference data 606. In contrast, the first DUT 106d provides near-field and far-field downlink performance 608a, as emulated in the enhanced test system 100, which indicates a drop in throughput 604 at higher levels of path loss, as compared with the reference data 606. As discussed, above, an automated result, e.g. pass or fail, may be provided based on the results of one or more tests.

The enhanced near-field MIMO wireless test system 100 may be embodied within a relatively small form factor, which is configured to test a wide variety of MIMO devices up to their maximum bandwidth, for each of a plurality of radio channels 54a-54d, for downlink and/or uplink operation. The operation of the channels may preferably be simultaneously excited, such that each of the transmitted signal are received properly on their destination.

The enhanced near-field MIMO wireless test system 100 is configured to operate in a near-field test environment, while emulating performance and/or providing correlation to provide results that reflect the performance of devices under test (DUT) 106 under real-world conditions. The enhanced system 100 and process 340 therefore provides testing, within a small, i.e. near-field, form factor, while emulating a significantly larger, i.e. far-field, environment, wherein the system accurately determines the performance of a DUT in a real-world MIMO environment.

The enhanced near-field MIMO wireless test system 100 may preferably be configured to provide near-field testing for any of:
- product development;
- product validation; and/or
- product production and shipping, e.g. quality control.

As well, the relative form factor, i.e. size, of the near-field MIMO wireless test system 100 may suitably be adapted for the type of testing to be performed. For example, product development testing may preferably be performed in a larger test chamber, such as for but not limited to:
- larger test antennas 110;
- room for different or additional instrumentation and/or sensors;
- room for engineers and/or technicians;
- room for larger prototypes; and/or
- increased access to any of DUTs 106, antennas, 110, 122, cables, or connections.

Testing of MIMO devices for product production and shipping may preferably be performed at one or more facilities, such as associated with one or more original device manufacturers (ODMs), e.g. contract manufacturers, and/or chipset vendors. The relative form factor, i.e. size, of the near-field MIMO wireless test system 100 is readily adaptable to the testing of DUTs 106 in production environments, such as at an ODM facility, wherein the space, cost and speed of testing becomes increasingly important. In such a testing environment, a small scale test chamber 102 may be used, having a relatively small DUT region 104a, wherein the near-field MIMO wireless test system 100 may readily provide performance testing over the full bandwidth of the DUTs 106, using signal emulation and data correlation to accurately reflect the downlink and/or uplink performance of DUTs 106 for different levels of path loss 402,602, i.e. reflecting DUT performance at different distances 52.

For a particular group of DUTs 106, near-scale MIMO performance tracking may preferably be performed using different test chambers 10, such as within both a larger near-scale chamber 102 and a smaller near-scale chamber 102, wherein the performance results may be compared between the different chambers 102. For example, the performance, of a known device under test DUT 106 may be compared to the performance of the same device DUT 106 within a different chamber 102, such as to confirm the suitability of a new near-scale chamber 102 for subsequent testing 340. In some embodiments, comparisons may preferably be made between one or more data points, and/or between entire performance charts, e.g. 408, 608.

In another example the performance of one or more wireless MIMO DUTs 106, such as representative of a new MIMO product series, may be tested within a first, i.e. known and trusted, larger near-scale chamber 102, such as to establish baseline specifications for the product series, along with establishing acceptable tolerances for the uplink and/or downlink throughput 204,404 at different levels of path loss 402,602, wherein the path loss is correlated to the attenuation of the device at different distances, i.e. ranges.

Thereafter, quality control testing 340 may be performed at any of the same test system 100, or at a different test system 100, such as configured for time and cost-efficient production testing, wherein the performance of production DUTs is checked and compared 350 (FIG. 8) to one or more of the previously established values and tolerances.

Therefore, during product development, wireless MIMO devices may initially be tested within a full scale chamber. At a latter stage in development, or in a latter stage, i.e. mass production, testing may be performed in the enhanced, i.e. small scale, test system 100, which provides improved setup, and decreased time and cost for quality control testing.

Figure 22:
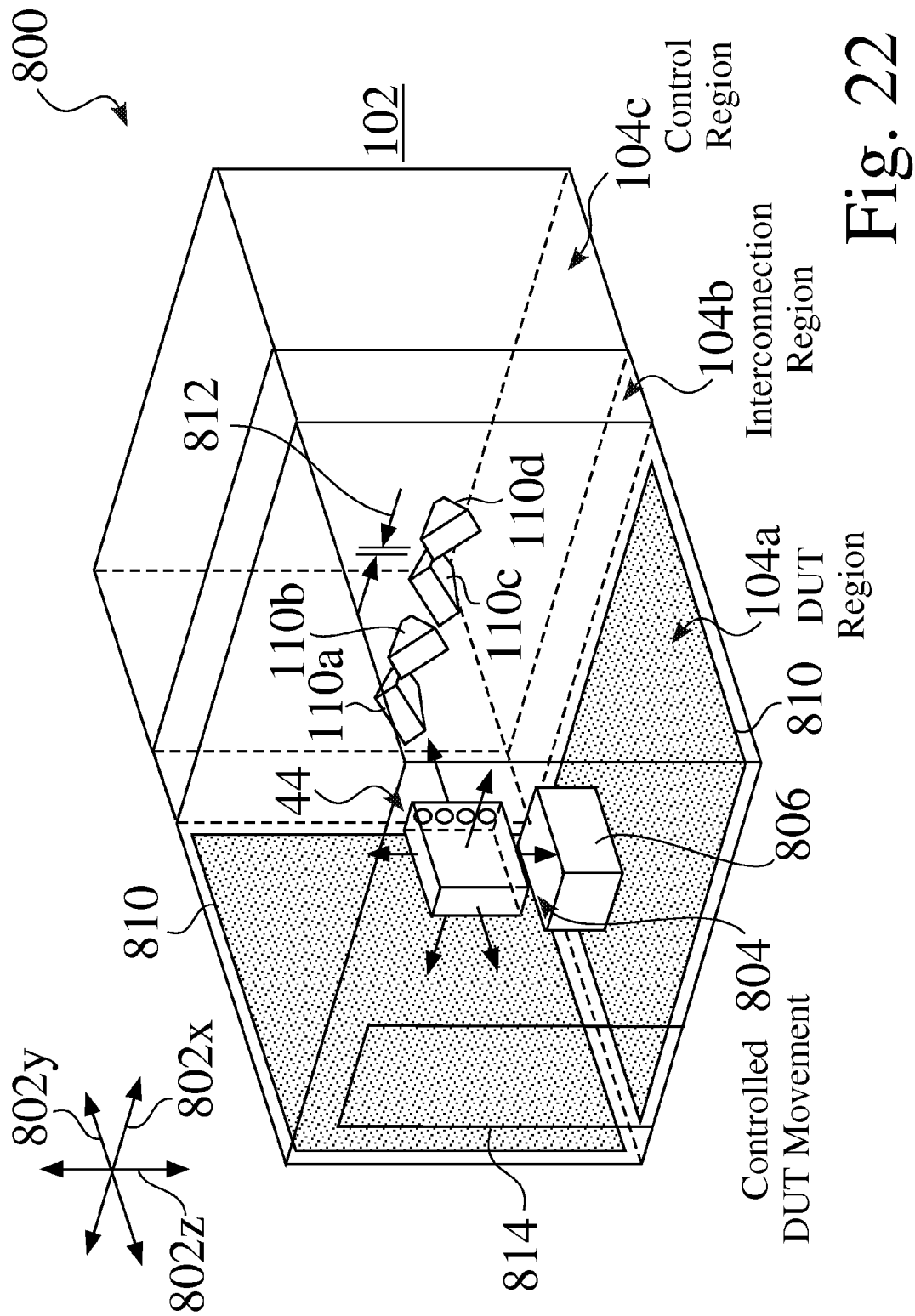
FIG. 22 is a partial cutaway view of an exemplary enhanced MIMO test chamber.

FIG. 22 is a partial cutaway view 800 of an exemplary test chamber 102 for an enhanced MIMO test chamber 100. In some embodiments of the test chamber 102, the any of the DUT 106 or the matrix 108 of antennas 110, e.g. 110a-110d, are moveable 804 in relation to each other. For example, as seen in FIG. 22, a movement mechanism 806 may preferably provide controlled movement 804 of a device under test DUT 106 in one or more directions 802, e.g. such as comprising movement 804 in an X-direction 802x, in a Y-direction 802y, and/or in a Z-direction 802z.

The matrix 108 of antennas 110, e.g. 110a-110d, seen in FIG. 22 may preferably be specified based on type of testing preformed with the specific MIMO test system 100. For example, in a large scale system 100 that is configured for initial product development, the antennas 110 may be chosen with less constraints on size and/or cost, while having more constraints on desired accuracy and/or sensitivity. In a current system configured for such testing, the test antennas cost approximately $10,000 each. In contrast, for a smaller scale system that is configured for latter quality control, the antennas 110 may be chosen with more constraints on size and/or cost. In a current system configured for such quality control testing, the test antennas cost approximately $100 each. While some components may be chosen to reduce the cost of some enhanced test systems 100, such as for production testing that requires basic confirmation of performance throughput at a limited number of attenuation levels, other parts and components, such as but not limited to any of standard parts, cables, instrumentation, processors, controllers, or storage.

As seen in FIG. 22, the matrix 108 of test antennas 110a-110d comprises part of the enhanced MIMO test system 100, and typically comprises standard MIMO antennas inside the DUT test region 104a. The antenna connections 118 (FIG. 18, typically comprise cables, e.g. SMA cables, that extend from the DUT test region, such as directly, or through fittings, e.g. coaxial bulkhead fittings, which are connectable to one or more cable connections that extend, such as through a connection region 104, toward the RF attenuation unit 120.

Similarly, devices to be tested DUT 106 are connectable, such as through fittings in the DUT test region, for any of power, as well as for input and output signal connections 134 (FIG. 3). During testing, one or more input signals 134, such as from a controller 132 (FIG. 3) are sent to the DUT, for the testing of processing and uplink performance. Similarly, received MIMO wireless MIMO downlink signals are received and processed by the DUT, wherein the resultant downlink signal 134 is transferred 134 and analyzed during the testing process.

As also seen in the FIG. 22, the matrix 108 of test antennas 110, e.g. 110a-110d, may preferably be located closely with respect to each other, such as having a consistent spacing 812 between them. In one current system embodiment 100, the antenna spacing 812 is 1 cm, which allows the antennas 110 to operate in a near-field environment 104a, while emulating any desired range in free space, from near-field to long range.

As further seen in FIG. 22, the DUT test region 104a may preferably comprises absorbing elements 810, such as to significantly reduce or eliminate reflected RF signals, such as located on all the interior surfaces of the DUT region 104, e.g. top, bottom, sides, and access door 814.

Once the DUT 106 is placed within the DUT test region and connected to power and signal connections 134, the access door is closed, and the system 100 powers up the DUT 106, to exercise and test the DUT 106 for all tested parameters and/or modes.

While the exemplary DUT test region 104a shown in FIG. 22, comprises a door 814, it should be understood that access 814 for the DUT test region may preferably be located anywhere with respect to the inner region 104a. For example, in some system configurations 100 that are configured for production testing 340, access 814 may be located on the top of the DUT region 104a, wherein a DUT 106 to be tested is lowered into the DUT region 104a, such as onto a test jig that comprises quick connections for power, input, and output signal signals, e.g. an RJ45 connector. In such as configuration, once the DUT 106 is hooked up and powered, the access door 814 is closed, and testing can begin.

As seen in FIG. 3 and FIG. 22, the a large portion of the controls, hardware and connections associated with the multiple inputs and outputs (MIMO) may preferably be located away from the DUT region 104, such as within any of the intermediate region 104b and/or the backend control region 104c. For example, the back end of the test antenna matrix 108, and the antenna cable 118 may preferably be routed through the intermediate region, such as exiting the chamber through a side panel bulkhead 114. The transmission and reception of wireless signals is intermingled, such in compliance with the real-world operation of the TDM device under test 106, to perform the near-field MIMO testing 340 that properly reflects how the device 106 is required to operate. The design of the test structure and methods for MIMO testing is readily scalable for the different system embodiments 100, even within a small form factor that may be required for production testing.

The enhanced near-field MIMO wireless test system 100 is therefore configurable to perform both uplink and downlink testing, to simulate multipath operation at different distances, for a plurality of modes and/or steps, such as to determine the throughput (megabits per second) of a device under test 106, as a function of path loss (dB).

In some system embodiments 100, such as for product development, testing 340 may be performed over a wide range of uplink and/or downlink path loss 402,602, such all the way to the point where the throughput 404,604 becomes zero. In other system embodiments 100, such as for production quality control, testing 340 may be performed over a certain range, such as to confirm that the performance is consistent with expected pass-fail criteria within part of the range, and possibly to confirm where the throughput starts dropping off at a certain angle. Such testing may not require testing the far range, i.e. all the way to the point where the throughput 404,604 becomes zero, as such testing may take too much time and fail to yield usable information for a production environment.

While some of the enhanced MIMO wireless test systems 100 are described herein for Near-field testing of MIMO devices, it should be understood that many of the structures and processes may preferably be used for far-field testing of components, such as for testing antennas. For example, the enhanced wireless test system 100 may preferably be configured to provide far-field measurements, such as for passive antenna testing. Such a system 100 may preferably provide 2-dimensional plots, simulated performance, and/or elevations, such as to gain spectral efficiency from one or more antennas.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A system comprising:
a test chamber having an interior region defined therein for mounting a MIMO device, the test chamber including at least one power connection and at least one signal connection for the MIMO device;
an antenna matrix located within the test chamber that includes a plurality of test antennas, where each of the test antennas corresponds to a MIMO channel; and
an attenuation unit connected to the antenna matrix that includes
a plurality of signal processing paths that are controllable to emulate a plurality of distances between the MIMO device and the plurality of test antennas; and
a controller configured to control the attenuation of each of the plurality of signal processing paths.

2. The system of claim 1, where each of the signal processing paths includes a programmable attenuator and a Butler matrix.

3. The system of claim 2, where the controller is configured to control each of the Butler matrices to controllable combine a signal.

4. The system of claim 1, where the attenuation unit is switchable between a plurality of frequency modes.

5. The system of claim 1, where the attenuation unit is configured to operate simultaneously on a plurality of frequency modes.

6. The system of claim 1, further comprising:
a signal source configured to generate a calibration signal at a particular frequency;
a calibration module configured to input the calibration signal into the antenna matrix; and
a power meter configured to measure the calibration signal and a signal received by the antenna matrix.

7. The system of claim 6, where the calibration signal is a continuous wave signal at the particular frequency that is matched to the signal received by the antenna matrix using the power meter.

8. The system of claim 1, where the interior region of the test chamber is composed of an RF shielded region that houses the MIMO device and the antenna matrix and at least one other region.

9. The system of claim 1, where the MIMO device includes a plurality of device antennas that are configured to transmit uplink signals and receive combined downlink signals.

10. A method comprising:
powering a MIMO device located within a test chamber;
controllably processing a multipath signal through a plurality of signal paths, wherein the multipath signal is attenuated to emulate a distance between the MIMO device and a plurality of test antennas, and wherein each of the plurality of test antennas is associated with an antenna path;
transmitting the processed multipath signal from the plurality of test antennas located within the test chamber;

receiving, at each MIMO antenna of the MIMO device, a downlink signal corresponding to the transmitted multipath signal;

processing the downlink signals received by the MIMO device; and generating an output that characterizes downlink performance of the MIMO device based on the downlink signals.

11. The method of claim 10, further comprising:

outputting one or more of the downlink signals received by the MIMO device.

12. The method of claim 10, further comprising:

determining whether downlink performance of the MIMO device at a particular distance is within an acceptable level by analyzing the downlink signals; and generating a performance indicator that specifies whether the MIMO device meets the acceptable level.

13. The method of claim 10, further comprising:

determining throughput of the MIMO device at an emulated distance as a function of path loss; and comparing the throughput to expected performance data for the emulated distance.

14. The method of claim 10, further comprising:

controlling frequency of each attenuated signal supplied by the plurality of signal paths.

15. The method of claim 10, further comprising:

generating a calibration signal, wherein the calibration signal is a continuous wave signal at a particular frequency;

transmitting the calibration signal from the MIMO device;

receiving the calibration signal at a reference antenna; and measuring the calibration signal at the MIMO device and the received calibration signal at the reference antenna.

16. The method of claim 10, further comprising:

calculating path loss based on the measured calibration signal and the received calibration signal.

17. The method of claim 15, further comprising:

comparing the measured calibration signal and the received calibration signal; and adjusting one or more of the antenna paths based on the comparison.

18. A method comprising:

causing an uplink signal to be transmitted by each of a plurality of device antennas of a wireless multiple input-multiple output (MIMO) device;

receiving a combined signal at each of a plurality of test antennas, where each test antenna is associated with an antenna path;

attenuating each of the antenna paths with a programmable attenuator;

combining the combined signals to emulate a distance between the plurality of device antennas and the plurality of test antennas; and determining throughput of the MIMO device at the emulated distance.

19. The method of claim 18, further comprising:

determining whether the throughput of the MIMO device at the emulated distance is within an acceptable level; and generating a performance indicator that specifies whether the MIMO device meets the acceptable level.

20. The method of claim 18, where the MIMO device and the plurality of test antennas are located within an RF shielded region of a test chamber.

* * * * *